US007901652B2

(12) United States Patent
Inoue et al.

(10) Patent No.: US 7,901,652 B2
(45) Date of Patent: Mar. 8, 2011

(54) METHOD OF PRODUCING POROUS SILICA-BASED PARTICLES

(75) Inventors: Kazuaki Inoue, Kitakyushu (JP); Kazuhiro Nakayama, Kitakyushu (JP); Akira Nakashima, Kitakyushu (JP)

(73) Assignee: JGC Catalysts and Chemicals Ltd., Kawasaki-shi, Kanagawa (JP)

( * ) Notice: Subject to any disclaimer, the term of this patent is extended or adjusted under 35 U.S.C. 154(b) by 399 days.

(21) Appl. No.: 11/793,707

(22) PCT Filed: Dec. 15, 2005

(86) PCT No.: PCT/JP2005/023013
§ 371 (c)(1),
(2), (4) Date: Jun. 21, 2007

(87) PCT Pub. No.: WO2006/068020
PCT Pub. Date: Jun. 29, 2006

(65) Prior Publication Data
US 2008/0160276 A1 Jul. 3, 2008

(30) Foreign Application Priority Data
Dec. 21, 2004 (JP) .................................. 2004-368582

(51) Int. Cl.
*C01B 33/141* (2006.01)
*C01B 33/143* (2006.01)
(52) U.S. Cl. ........................ 423/325; 423/328.1; 423/335
(58) Field of Classification Search .................. 428/402, 428/403, 404; 423/325, 328.1, 335
See application file for complete search history.

(56) References Cited

U.S. PATENT DOCUMENTS

| 5,342,870 A * | 8/1994 | Stein et al. ..................... 524/188 |
| 5,958,577 A * | 9/1999 | Sugimoto et al. ............. 428/333 |
| 6,746,659 B2 * | 6/2004 | Pinnavaia et al. ............. 423/702 |
| 6,849,242 B1 * | 2/2005 | Koeppler et al. ............. 423/338 |
| 7,128,884 B2 * | 10/2006 | Kirkland et al. ............... 423/335 |
| 2008/0090070 A1 * | 4/2008 | Muraguchi et al. ........... 428/332 |

FOREIGN PATENT DOCUMENTS

| JP | H04-070335 | 3/1992 |
| JP | H04-288353 | 10/1992 |
| JP | H07-133105 | 5/1995 |
| JP | H07-172814 | 7/1995 |
| JP | H08-026716 | 1/1996 |
| JP | H08-034607 | 2/1996 |
| JP | H08-091821 | 4/1996 |

(Continued)

*Primary Examiner* — H. (Holly) T Le
(74) *Attorney, Agent, or Firm* — Leydig, Voit & Mayer, Ltd.

(57) ABSTRACT

Porous silica-based particles with relatively larger average diameter of 1 micron or more and a low particle density are prepared. The method includes the steps of (a) preparing two-layer separated liquid including an organic silicon compound layer and a water layer, then adding an organic solvent, an alkali, and a surfactant into the water layer while agitating at least the water layer so that the organic silicon compound layer and the water layer are not completely mixed with each other, further hydrolyzing and/or partial hydrolyzing the organic silicon compound in the mixed aqueous solution to prepare silica-based particle precursors, (b) adding sodium aluminate into the mixed aqueous solution containing the silica-based particle precursors and then preparing silica-based particles having pores, cavities or voids inside the particles, and (c) washing and drying the silica-based particles. The particles are useful for various applications such as microcapsules, adsorbents, catalysts, and so on.

24 Claims, 2 Drawing Sheets

FOREIGN PATENT DOCUMENTS

| | | |
|---|---|---|
| JP | 2000-017074 | 1/2000 |
| JP | 2000-178020 | 6/2000 |
| JP | 2000-204168 | 7/2000 |
| JP | 2001-233611 | 8/2001 |
| JP | 2002-187712 | 7/2002 |
| WO | WO 97/16374 | 5/1997 |
| WO | WO 03/055802 | 7/2003 |

* cited by examiner

METHOD OF PRODUCING POROUS SILICA-BASED PARTICLES

TECHNICAL FIELD

The present invention relates to a method of easily and efficiently producing porous silica-based particles with the relatively larger average diameter of 1 micron or more and also having a low particle density.

BACKGROUND TECHNOLOGY

There have been known many methods for producing porous silica-based particles, and the representative ones include a method in which porous particles are grown by the sol-gel process, and a method in which organic compounds or inorganic compounds are removed from composite particles to make the particles porous.

As for the method of producing porous particles by the sol-gel process, there has been proposed, for instance, a method in which alcohol, water and an acidic catalyst are added to tetraethyl orthosilicate to effect partial hydrolysis, then dibutyl phthalate is added to the mixture, and the mixture solution is further mixed with an ammonia aqueous solution containing a surfactant with agitation for its emulsification and the partial hydrolysate or the hydrolysate therein is polycondensed (Patent document 1), and a method in which tetraalkoxy silane or water glass (sodium silicate) is hydrolyzed in the presence of ammonia to generate a silica sol, then a carboxylic acid or carboxylate and an aliphatic nitrile compound are added to the sol to generate a silica gel (Patent document 2).

As for the method of producing porous particles by removing organic compounds from composite particles, there has been proposed, for instance, a method in which an activated silica and a cation-based surfactant are mixed and reacted in an alkaline phase to generate composite particles of the silica and the cation-based surfactant, then the composite particles are calcinated to remove the cation-based surfactant from the composite particles (Patent document 3), and a method in which water or acidic aqueous solution is added to a mixture of water-compatible organic solvent, alkylamine and silicate ester, or a mixture containing a combination of silicate ester and metal salt which is soluble in water-compatible organic solvent with agitation, then the generated silica-alkylamine composite products are grown to spherical particles and the alkylamine is removed from the composite particles (Patent document 4).

As for the method of producing porous particles by removing inorganic compounds from composite particles, there has been proposed, for instance, a method in which tetraalkoxysilane and boric compounds are hydrolyzed and polycondensed in a mixture solution of water and water-soluble organic solvent to generate spherical particles containing $SiO_2$ and $B_2O_3$ as main components, then the $B_2O_3$ is eluted to remove the $B_2O_3$ from the composite particles (Patent document 5), and a method in which a silicate of alkali metal, ammonium or organic base, and an inorganic compound such as sodium aluminate are added simultaneously into an alkaline aqueous solution having pH 10 or more to generate colloidal particles consisting of the silica and the inorganic oxides, and then the inorganic oxides in the colloidal particles are removed with treatment by using an acid or a cation-exchange resin (Patent document 6).

On the other hand, the method has been already known in which at a boundary face of two-layer separated liquid including a layer of organic silicon compounds and a layer of water, or in the water layer, the organic silicon compounds are hydrolyzed and polycondensed to produce polyorganosiloxane particles and the like in the presence of organic solvent, alkali and/or surfactant (Patent document 7, Patent document 8 and Patent document 9). However, these methods are related to the method of producing dense silica-based particles having uniform particle diameters and the like, but are not related to the method of producing porous silica-based particles.

Patent document 1: Japanese Laid-open Patent Publication No. H08-91821
Patent document 2: Japanese Laid-open Patent Publication No. H08-26716
Patent document 3: Japanese Laid-open Patent Publication No. H08-34607
Patent document 4: Japanese Laid-open Patent Publication No. 2002-187712
Patent document 5: Japanese Laid-open Patent Publication No. H07-172814
Patent document 6: Japanese Laid-open Patent Publication No. H07-133105
Patent document 7: Japanese Laid-open Patent Publication No. H04-70335
Patent document 8: Japanese Laid-open Patent Publication No. 2000-17074
Patent document 9: Japanese Laid-open Patent Publication No. 2000-204168

DISCLOSURE OF THE INVENTION

Problems to be Solved by the Invention

The methods publicly known and described in patent documents 1-6 can produce porous silica-based particles, however these methods do not always easily and efficiently produce porous silica-based particles having the relatively larger average diameter of 1 micron or more and also with a low particle density.

Then, the present inventors made strenuous efforts for solving the problems described above, and finally found the fact that porous silica-based particles can easily produce by adding sodium aluminate to a mixed aqueous solution including silica-based particle precursors comprised of hydrolysate and/or partial hydrolysate of organic silicon compounds without complicated operations thereafter, and then as a result the present inventors have achieved the present invention based on the finding.

Namely, an object of the present invention is to provide a novel method of easily and efficiently producing porous silica-based particles having the relatively larger average diameter of 1 micron or more and also with a low particle density.

Another object of the present invention is to provide porous silica-based particles obtained from this novel method in which the porous silica-based particles have average particle diameter in the range from 1 to 15 μm, and also a compacted bulk density in the range from 0.20 to 0.76 g/cm³, preferably in the range from 0.25 to 0.62 g/cm³.

In addition, still another object of the present invention is to provide silica-based particles produced by absorbing or adsorbing the desired organic compounds or inorganic compounds into the porous silica-based particles, and silica-based particles produced by coating the surface of the above silica-based particles with the same or different kind of the inorganic compounds or hydrolysate of the compounds, or with the same or different kind of the organic compounds or a polymer of the compounds.

Means for Solving the Problems

A first method of producing porous silica-based particles according to the present invention is used for producing porous silica-based particles with a low particle density, and the method comprises the steps of:

(a) preparing two-layer separated liquid consisting of a layer of an organic silicon compound expressed by the following general formula (I) and a layer of water, then adding an organic solvent, an alkali, and a surfactant into the water layer while agitating at least the water layer so that the organic silicon compound layer and the water layer are not completely mixed with each other, further hydrolyzing and/or partial hydrolyzing the organic silicon compound in the mixed aqueous solution to prepare silica-based particle precursors;

$$R^1_n Si(OR^2)_{4-n} \quad (I)$$

(wherein $R^1$ is a monad. i.e. monovalent group, selected from an alkyl group having the number of carbon atoms from 1 to 10, an aryl group having the number of carbon atoms from 6 to 10, and an unsaturated aliphatic group having the number of carbon atoms from 2 to 10, which are allowed to contain substituent groups therein, and $R^2$ is a monad selected from a hydrogen atom, an alkyl group having the number of carbon atoms from 1 to 5, and an acyl group having the number of carbon atoms from 2 to 5, and then n is an integer from 1 to 3.)

(b) adding sodium aluminate into the mixed aqueous solution containing the silica-based particle precursors and then preparing silica-based particles having pores, cavities or voids inside the particles; and (c) washing and drying the silica-based particles.

A second method of producing porous silica-based particles according to the present invention is used for producing porous silica-based particles with a low particle density, and the method comprises the steps of:

(a) preparing two-layer separated liquid consisting of a layer of an organic silicon compound expressed by the following general formula (I) and a layer of water, then adding an organic solvent, an alkali, and a surfactant into the water layer while agitating at least the water layer so that the organic silicon compound layer and the water layer are not completely mixed with each other, further hydrolyzing and/or partial hydrolyzing the organic silicon compound in the mixed aqueous solution to prepare silica-based particle precursors;

$$R^1_n Si(OR^2)_{4-n} \quad (I)$$

(wherein $R^1$ is a monad selected from an alkyl group having the number of carbon atoms from 1 to 10, an aryl group having the number of carbon atoms from 6 to 10, and an unsaturated aliphatic group having the number of carbon atoms from 2 to 10, which are allowed to contain substituent groups therein, and $R^2$ is a monad selected from a hydrogen atom, an alkyl group having the number of carbon atoms from 1 to 5, and an acyl group having the number of carbon atoms from 2 to 5, and then n is an integer from 1 to 3.)

(b) adding sodium aluminate into the mixed aqueous solution containing the silica-based particle precursors and then preparing silica-based particles having pores, cavities or voids inside the particles;

(c) washing and drying the silica-based particles, if necessary;

(d) preparing silica-based particles having at least pores, cavities or voids inside the particles by adding the silica-based particles in an alkaline aqueous solution to dissolve a part of a covering layer formed on an external peripheral surface of the silica-based particles; and (e) washing and drying the silica-based particles.

In the step (a), it is preferable that the organic solvent, the alkali and the surfactant are added to the mixed aqueous solution so that pH of the solution becomes in a range from 8.2 to 9.8 while keeping the temperature of the solution in a range from 0.1 to 10° C., and then the solution is agitated at a rotating speed in the range from 30 to 100 rpm until the layer of organic silicon compounds disappears substantially. (In this specification, the temperature of 0.1° C. means a temperature close to 0° C. at which water is not frozen.)

In the step (a), it is preferable that the mixed aqueous solution is left for 0.1 to 7 hours with agitation at a temperature condition from 1 to 30° C. after the layer of organic silicon compounds disappears substantially.

In the step (a), it is preferable that the organic solvent is compatible with water and also is composed of one or more selected from the group consisting of alcohols, glycols, glycol ethers, and ketones capable of diluting or dispersing the organic silicon compound.

In the step (a), it is preferable that the alkali is composed of one or more selected from the group consisting of an ammonia aqueous solution, ammonia gas, an aqueous solution of alkali metal salt, an aqueous solution of quaternary ammonium salt and amines, and all of which act as hydrolytic catalyst for the organic silicon compounds.

In the step (a), it is preferable that the surfactant is composed of one or more selected from the group consisting of anion-based surfactants.

In the step (b), it is preferable that the sodium aluminate is added to the mixed aqueous solution, at a weight ratio of $Al_2O_3/SiO_2$ being in a range from 3/97 to 20/80 when the sodium aluminate is expressed by $Al_2O_3$ and the organic silicon compound is expressed by $SiO_2$.

In the step (b), it is preferable that the mixed aqueous solution is left for 0.5 to 50 hours with agitation at a temperature in the range from 5 to 30° C. after adding the sodium aluminate thereto.

In the step (d), it is preferable that the alkaline aqueous solution is a solution including alkali metal hydroxide.

It is preferable that the silica-based particles dried in the step (c) or the step (e) are heated at a temperature in the range from 200 to 1100° C.

It is preferable that the silica-based particles which are dried or heated as described above are coated with inorganic compounds or a hydrolysate thereof on their surfaces by adding an inorganic compound solution prepared by dissolving or suspending an inorganic compound in an organic solvent, water or a mixture thereof, to a suspension prepared by suspending or dispersing the silica-based particles in an organic solvent, water or a mixture thereof.

It is preferable that the inorganic compound is a silicic acid solution or an organic silicon compound and the surfaces of the silica-based particles are coated with silicon components. Further, it is preferable that the organic silicon compound is composed of one or more selected from the group consisting of an ethyl silicate, a methyl silicate and other organic silicon compounds expressed by the general formula (I) as described above.

It is preferable that the silica-based particles coated with the silicon components are heated at a temperature in the range from 200 to 1100° C., if necessary, after washed and dried.

Further, it is preferable that the silica-based particles which are dried and heated as described above are coated with an organic compound on their surfaces by adhering a powdery organic compound to the surfaces and then melting at least a portion of the organic compounds adhered to the surfaces.

It is preferable that the organic compound is a thermoplastic resin having a glass transition point of 200° C. or less, or a thermoplastic resin having a curing temperature of 200° C. or less. Further, it is preferable that the thermoplastic resin is selected from the group consisting of a methyl methacrylate resin, an acrylic styrene copolymer resin, or a mixture thereof.

It is preferable that a thickness of the inorganic compound or the organic compound coating on the silica-based particles is in the range from 0.005 to 2 μm.

It is preferable that the porous silica-based particles obtained from the steps as described above have an average diameter of particles in a range from 1 to 15 μm, and have a compacted bulk density in a range from 0.25 to 0.62 g/cm³. It is also preferable that the porous silica-based particles have an oil absorption rate in the range from 0.63 to 1.53 ml/g, and have a compressive strength in a range from 4 to 100 kgf/mm².

The porous silica-based particles according to the present invention are suitably used for applications to provide silica-based particles produced by absorbing or adsorbing an inorganic compound and/or an organic compound to inside of the particles, or to provide silica-based particles produced by coating the surface of the above silica-based particles with the same or different kind of the inorganic compound or a hydrolysate thereof, or with the same or different kind of the organic compound or a polymer thereof.

EFFECTS OF THE INVENTION

With the present invention, it is possible to easily and efficiently produce porous silica-based particles with a relatively large average diameter in the range from 1 to 15 μm and a low compacted bulk density in the range from 0.20 to 0.76 g/cm³, preferably in the range from 0.25 to 0.62 g/cm³. Also it is possible to produce the porous silica-based particles with a compressive strength in the range from 4 to 100 kgf/mm² by drying the particles or by drying and heating the particles.

In addition, since any specific organic or inorganic compounds used in some conventional techniques for forming pores, cavities or voids in the particles are not used in the present invention, contaminants formed from the compounds or reaction products thereof little remain in the particles.

Further, in the first method of producing porous silica-based particles according to the present invention, since the number of processes for producing the porous silica-based particles are relatively fewer and operations for each process can successively be performed, operability of the production processes of the present invention are excellent and efficient, and also a production cost thereof can be reduced.

In addition, since the porous silica-based particles obtained by the first method according to the present invention have lots of pores, cavities or voids in the particles, when a coating film is formed on a substrate using a coating liquid or a coating material prepared by mixing the particles with matrix components for forming a coating film, the coating film having features of a low refractive index, a low dielectric constant, a low reflectivity and the like can be formed on the substrate, although these features are varied according to such parameters as a component of the matrix, and a mixing ratio thereof.

Furthermore, the porous silica-based particles obtained by the second method of producing porous silica-based particles according to the present invention, especially porous silica-based particles with the pores, cavities or voids exposed on surfaces are excellent in absorbing or adsorbing inorganic compounds and/or organic compounds dissolved or dispersed in an organic solvent, water or a mixture thereof, and therefore features and positive effects retained by the compounds themselves are provided stably for a long term by absorbing or adsorbing these compounds into the particles. Besides, when the surfaces of the porous silica-based particles obtained as described above are coated with a thin film composed of inorganic compounds such as silicon compounds and/or organic compounds such as high molecular compounds, it is possible to control and prevent the inorganic compounds and/or the organic compounds absorbed or adsorbed into the particles from being eluted from the particles within a short period of time. On the other hand, it is possible to have the features or the positive effects of the materials absorbed or adsorbed into the particles achieved since these materials absorbed or adsorbed into the particles can be eluted instantly or within a short period of time due to fusion, dissolution and breakage of coating layers when the silica-based particles having the coating layers (including the particles mixed with matrix components or organic compounds and the like) are heated, immersed into a solution or compressed mechanically. Namely, the porous silica-based particles according to the present invention can advantageously be used for applications of micro-encapsulation for these materials.

In addition, since the porous silica-based particles according to the present invention, especially the porous silica-based particles with pores, cavities or voids as well as on the surfaces have a larger specific surface, the particles can also advantageously be used for applications of eliminating impurities containing gaseous materials or liquid materials.

BEST MODE FOR CARRYING OUT THE INVENTION

Figure 1:
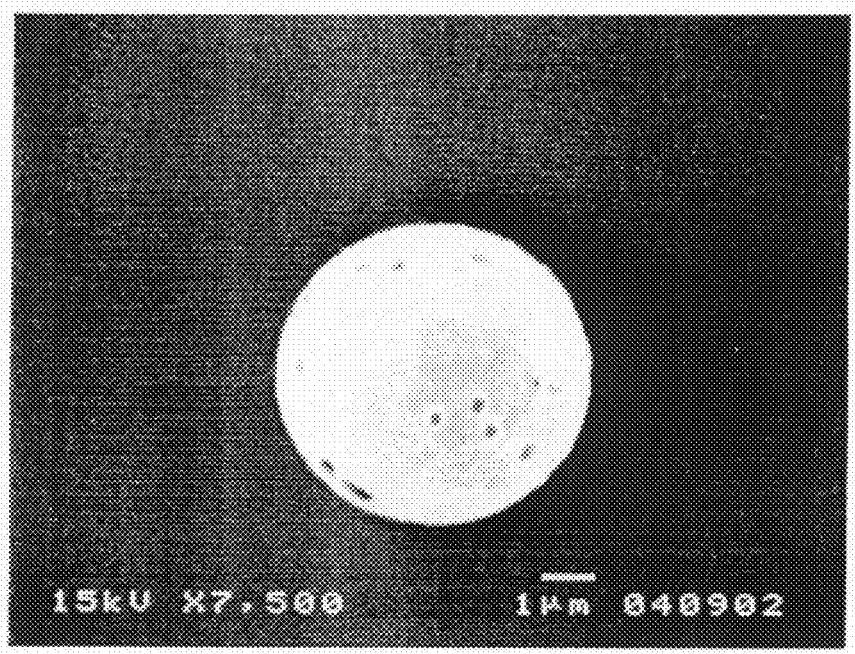
FIG. 1 is a picture taken by a scanning electron microscope (7,500 magnifications) of porous silica-based particles B-(c) (with a covering layer) according to the present invention obtained in the step (c) of Example 2.

Preferable method of producing porous silica-based particles with a low particle density according to the present invention and the porous silica-based particles obtained thereby are described below.

Method (1) of Producing Porous Silica-Based Particles

A first method of producing porous silica-based particles according to the present invention is used for producing porous silica-based particles with a low particle density, and the method comprises the steps of:

(a) preparing two-layer separated liquid consisting of a layer of an organic silicon compound expressed by the following general formula (I) and a layer of water, then adding an organic solvent, an alkali, and a surfactant into the water layer while agitating at least the water layer so that the organic silicon compound layer and the water layer are not completely mixed with each other, further hydrolyzing and/or partial hydrolyzing the organic silicon compound in the mixed aqueous solution to prepare silica-based particle precursors;

$$R^1{}_n Si(OR^2)_{4-n} \qquad (I)$$

(wherein $R^1$ is a monad selected from an alkyl group having the number of carbon atoms from 1 to 10, an aryl group having the number of carbon atoms from 6 to 10, and an unsaturated aliphatic group having the number of carbon atoms from 2 to 10, which are allowed to contain substituent groups therein, and $R^2$ is a monad selected from a hydrogen atom, an alkyl group having the number of carbon atoms from 1 to 5, and an acyl group having the number of carbon atoms from 2 to 5, and then n is an integer from 1 to 3.)

(b) adding sodium aluminate into the mixed aqueous solution containing the silica-based particle precursors and then preparing silica-based particles having pores, cavities or voids inside the particles; and (c) washing and drying the silica-based particles.

Step (a)

In this step, the silica-based particle precursors mainly composed of the partial hydrolysate and/or hydrolysate of the organic silicon compound are prepared.

The organic silicon compounds expressed by the general formula (I) above include, but not limited to, tetra methoxy silane, tetraethoxy silane, tetraisopropoxy silane, methyl trimethoxy silane, dimethyl dimethoxy silane, phenyl trimethoxy silane, diphenyl-dimethoxy-silane, methyl triethoxy silane, dimethyl diethoxy silane, phenyl triethoxy silane, diphenyl diethoxy silane, isobutyl trimethoxy silane, vinyl trimethoxy silane, vinyl triethoxy silane, vinyl-tris(β methoxyethoxy)silane, 3-glycidoxypropyl trimethoxy silane, 3,3,3-trifluoropropyl trimethoxy silane, methyl-3,3,3-trifluoropropyl dimethoxy silane, β-(3,4-epoxy cyclohexyl)ethyltrimethoxy silane, γ-glycidoxytripropyl trimethoxy silane, γ-glycidoxypropyl methyldiethoxy silane, γ-glycidoxypropyl triethoxy silane, γ-methacryloxypropyl methyldimethoxy silane, γ-methacryloxypropyl trimethoxy silane, γ-methacryloxypropyl methyldiethoxy silane, γ-methacryloxypropyl triethoxy silane, N-β(aminoethyl) γ-aminopropyl methyldimethoxy silane, N-β(aminoethyl) γ-aminopropyl trimethoxy silane, N-β(aminoethyl) γ-aminopropyl triethoxy silane, γ-aminopropyl trimethoxy silane, γ-aminopropyl triethoxy silane, N-phenyl-γ-aminopropyl trimethoxy silane, γ-mercaptopropyl trimethoxy silane, trimethylsilanol, methyltrichloro silane, methyldichloro silane, dimethyldichloro silane, trimethylchloro silane, phenyltrichloro silane, diphenyldichloro silane, vinyl trichloro silane, trimethyl bromosilane, diethysilane.

Of the organic silicon compounds above, preferred compounds for use are methyltrimethoxy silane, vinyl trimethoxy silane, 3-glycidoxypropyl trimethoxy silane, and the like.

These organic silicon compounds can be used either singly, but two or more kinds of compounds can be used in combination.

The organic silicon compound is adjusted at a temperature in the range from 0.1 to 15° C., preferably in the range from 0.1 to 10° C., and more preferably in the range from 0.1 to 5° C., and then is preferably poured into water (pure water) which temperature has been adjusted to the above one, namely in the range from 0.1 to 15° C., preferably in the range from 0.1 to 10° C., and more preferably in the range from 0.1 to 5° C. In this step, when the temperature of water is less than 0.1° C., sometimes the water freezes, and when the temperature is over 15° C., sometimes a particle size distribution of the obtained silica-based particle precursors becomes worse and broader. The expression of "worse size distribution" as used herein means that the coefficient of particle diameter variation (CV value) obtainable from the equation of "CV value=Standard deviation of particle diameters (σ)/Average diameter (Dm)×100" becomes larger, and the expression is used with the same meaning in the following descriptions. Furthermore, if a temperature of the organic silicon compound is less than 0.1° C., when the silicon compound is mixed with water, sometimes the water may be frozen. When the temperature is over 15° C., in the step of hydrolyzing the organic silicon compound, a portion of the partial hydrolysate is easily gelated, or a size distribution of the obtained silica-based particle precursors may be worse. In Examples, the expression of "about 0° C." means a temperature which is close to 0° C., and as far as water is not frozen, the temperature is included in the desired temperature as described above.

The organic silicon compound itself is hydrophobic, and is hydrolyzed rather slowly, so that, when the organic silicon compound is mixed with water, two-layer separated liquid or two-phase liquid which is separated to upper and lower layers. This two-layer separated liquid is separated to upper and lower layers because of difference between a specific gravity of the organic silicon compound and that of water. As the specific gravities of many organic silicon compounds are lighter than that of water, generally the upper layer is a layer of the organic silicon compound, and a lower layer is a water layer. However, because some organic silicon compounds (such as diphenyl diethoxysilane) are heavier than water, the upper layer is a water layer and the lower layer is an organic silicon compound layer. Therefore, description in this specification assumes a case where an upper layer is a layer of the organic silicon compound and a lower layer is a water layer, but the present invention is not limited to this case.

A quantity of water is to be more than a quantity required for hydrolysis of the organic silicon compound, and there is not specific restriction over the quantity so long as the two-layer separated liquid can be formed, but the quantity of water is preferably in the range from 3 to 50 times, and more preferably in the range from 4 to 20 times of the quantity of organic silicon compound (weight basis). When the quantity of water is less than 3 times, when the organic silicon compound is hydrolyzed, sometimes a portion of the partial hydrolysate is gelated, or the obtained silica-based particle precursors may be agglomerated. When the quantity of water is over 50 times, a production efficiency of the finally obtained silica-based particles may be deteriorated, or it becomes impossible to obtain particles with a desired diameter.

Then an organic solvent, an alkali, and a surfactant are added in the water layer while agitating at least the water layer at a degree where the organic silicon compound layer and the water layer are not mixed with each other completely, fine silica-based seed particles or precursors thereof containing partial hydrolysate and/or hydrolysate of the organic silicon compound are generated in the water layer (in the mixed aqueous solution). Furthermore, the silica-based seed particles or the precursors thereof aggregate with partial hydrolysate and/or hydrolysate are generated or deposited on peripheral surfaces of the agglomerates to finally provide silica-based particle precursors containing partial hydrolysate and/or hydrolysate of the organic silicon compounds, although the detailed mechanism of the reaction is still unknown.

In this step, agitation is preferably performed at a degree at which the organic silicon compound layer and the water layer are not completely mixed with each other, and the organic silicon compound is not suspended in the water layer, and also at which the organic solvent, the alkali, and the surfactant are quickly and homogeneously mixed in the water layer.

Any type of organic solvents may be used in the present invention so long as the organic silicon compound can be diluted or dispersed in the organic solvent, and preferably any one selected from alcohols, glycols, glycol ethers, and ketones should be used. Of these materials, alcohols such as butyl alcohol, ethyl alcohol, or methyl alcohol are preferably used. The organic solvent may be used singly, or two or more solvents may be used in the mixed state.

A quantity of the organic solvent added in this step is in the range from 0.001 to 5% by weight against a quantity of water, and preferably in the range from 0.01 to 1% by weight. (Herein, the "quantity of water" means a sum of a quantity of water used for preparing a two-layer separated solution, and a quantity of water used in a case where the organic solvent, the alkali, and the surfactant are diluted in water.) When the quantity of added organic solvent is less than 0.001% by weight, solubility of the organic silicon compound is deteriorated, and as a result, sometimes the organic silicon compound is not well mixed in the mixed aqueous solution. When the quantity of added organic solvent is over 5% by weight, a particle size distribution of the obtained silica-based particle precursors tends to become worse.

When the organic solvent is added into the water layer, it makes a mixed aqueous solution, and the organic silicon compound is easily dispersed in the mixed aqueous solution, and therefore the organic silicon compound is hydrolyzed or partially hydrolyzed in the presence of the added alkali to generate the silica-based seed particles or precursors thereof, and when the silica-based seed particles or precursors thereof agglomerate or bind to each other, the silica-based particle precursors are obtained. As the silica-based seed particles or the silica-based seed particle precursors contains hydrocarbon group $R^1$ originated from the organic silicon compound, they indicate a hydrophobic nature.

The alkali used in this step includes, but not limited to, ammonia water, ammonia gas, an aqueous solution of an alkali metal salt, an aqueous solution of a quaternary ammonium salt, and amines. Of these materials, the alkali such as ammonia water or ammonia gas is preferably used. The alkali functions as a catalyst for hydrolysis of the organic silicon compound.

A quantity of alkali added in this step gives influence to a diameter of the generated silica-based particle precursors. Generally, when the quantity increases, an average diameter of the silica-based particle precursors becomes smaller, and when the quantity decreases, an average diameter of the silica-based particle precursors becomes larger. Therefore, the quantity of added alkali may be decided according to a desired particle diameter of the silica-based particle precursors, and generally the quantity is in the range from 0.0001 to 0.1% by weight, and preferably in the range from 0.001 to 0.05% by weight against a quantity of water. (Herein the "quantity of water" has the meaning as described above.) When the quantity is less than 0.0001% by weight, sometimes the hydrolysis reaction of the organic silicon compound is remarkably slow, or partial hydrolysate of the organic silicon compound is gelated. When the quantity is over 0.1% by weight, a diameter of the obtained silica-based particle precursors becomes smaller, and furthermore a particle size distribution thereof becomes worse.

To describe in further details, the alkali is added into the water layer so that pH of the mixed aqueous solution is preserved within the range from 8.1 to 10.2, preferably within the range from 8.2 to 9.8, and more preferably within the range from 8.5 to 9.4. When the pH value becomes larger, a rate of hydrolysis of the organic silicon compound becomes faster, and a number of fine silica-based seed particles are generated, whereby it becomes difficult to obtain silica-based particle precursors having a large average diameter.

There is no specific restriction over the surfactant used in the present invention so long as water soluble one, but it is preferable to use an anion-based surfactant. More specifically, it is preferable to use an anion-based surfactant such as alkyl sulfuric ester, alkyl naphthalenesulfonate, alkyl sulfosuccinate, alkyl diphenylether disulfonate, alkyl phosphate, polyoxyethylene alkyl sulfuric ester, polyoxyethylene alkylaryl sulfuric ester, condensate of naphthalene formalin sulfonic acid. Of these materials, it is preferable to use an anion-based surfactant such as octyl sodium naphthalenesulphonate, or alkyl diphenylether sodium sulfonate.

A quantity of the surfactant to be added in this step is desired to be in the range from 0.005 to 1% by weight against a quantity of water, preferably in the range from 0.01 to 0.5% by weight. (The "quantity of water" as used herein has the same meaning as that described above.) When the quantity is less than 0.005% by weight, sometimes partial hydrolysate of the organic silicon compound is gelated, or a yield of the silica-based particle precursors becomes lower. When the quantity is over 1% by weight, a particle size distribution of the obtained silica-based particle precursors becomes worse, or it becomes difficult to obtain particles having a desired diameter.

It is to be noted that, since the surfactant has high affinity with the silica-based seed particles or precursors thereof, the surfactant has the tendency to make the particles or the precursors agglomerate or bind to each other and further to fetches partial hydrolysate and/or hydrolysate, thus the silica-based particle precursors being efficiently produced, although the mechanism is still unknown.

The organic solvent, the alkali, and the surfactant may be added discretely, but it is preferable to mix the materials by the respective quantities as described above and add the mixture in the water layer. Furthermore, it is preferable to dilute the materials in pure water before added in the water material. In addition, when adding the material or the mixture thereof in the water layer, it is preferable to put a capillary tube into the water layer and to make the materials flow out from a nozzle of the capillary tube located at a lower position of the water layer. When aqueous solution of the materials (or materials diluted with water) are directly added in the organic silicon compound layer, partial hydrolysis and/or hydrolysis of the organic silicon compound rapidly proceeds, and in that case the partial hydrolysate of the organic silicon compound is gelated, which makes it difficult to obtain particles having a desired form or desired physical properties.

Temperatures of the organic solvent, the alkali, the surfactant, or the mixture thereof are preferably cooled or adjusted to the range from 0.1 to 15° C., preferably to the range from 0.1 to 10° C., and more preferably to the range from 0.1 to 5° C. when added in the water layer, and furthermore it is preferable to cool or adjust a temperature of the organic silicon compound layer constituting the two-layer separated liquid, with agitation, to the range from 0.1 to 15° C., preferably to the range from 0.1 to 10° C., and more preferably to the range from 0.1 to 5° C. When the temperatures of the organic solvent, the alkali, the surfactant, or the mixture thereof are less than 0.1° C., sometimes the water is frozen, and when the temperatures are over 15° C., a particle size distribution of the obtained silica-based particle precursors becomes worse. Furthermore, when the temperature of the organic silicon compound layer is less than 0.1° C., sometimes the water is frozen, and when the temperature is over 15° C., when the organic silicon compound is hydrolyzed, a portion of the partial hydrolysate of the organic silicon compound is sometimes gelated, or a particle size distribution of the obtained silica-based particle precursors becomes worse.

Although the conditions for adding the organic solvent, the alkali, the surfactant, or the mixture thereof vary dependent upon a desired diameter of the silica-based particle precursors or other requirements, it is preferable to set an agitation feather of an agitator within a water layer of the two-layer separated liquid and slowly agitate the water layer by rotating the agitation feature at the rotating speed of 30 to 100 rpm, preferably at the rotating speed of 50 to 70 rpm at a degree where the organic silicon compound layer and the water layer is not completely mixed with each other for one hour or less, preferably for 0.5 to 10 minutes. When the rotating speed is less than 30 rpm, a long time is required for having the added materials distributed homogeneously in the water layer, and furthermore it becomes more difficult for the organic silicon compound to be mixed in the water layer. Furthermore, when the rotating speed is over 100 rpm, the organic silicon compound layer and the water layer are mixed with each other too much, which is not preferable. Furthermore, although the time required for addition is dependent on an aperture of the nozzle or other factors, there is not specific restriction over the time. When they are added controlling the pH value, addition may be performed relatively slowly, but the time over one hour is not advantageous.

The mixed aqueous solution obtained by adding the organic solvent, the alkali, and the surfactant in the water layer and having pH in the range from 8.1 to 10.2, preferably in the range from 8.2 to 9.8, and more preferably in the range 8.5 to 9.4 is preferably agitated slowly at a rotating speed of 30 to 100 rpm keeping the mixture solution at a temperature in the range from 0.1 to 15° C., preferably in the range from 0.1 to 10° C., and more preferably in the range from 0.1 to 5° C. to hydrolyze or partially hydrolyze the organic silicon compound. As hydrolysis and/or partial hydrolysis of the organic silicon compound proceeds, the organic silicon compound layer is fetched into the water layer (i.e. the mixed aqueous solution) and substantially disappears, and only the mixed aqueous solution containing partial hydrolysate and/or hydrolysate of the organic silicon compound remains. The time from the time point when the operation is started until the time point when the organic silicon compound layer substantially disappears varies dependent upon the conditions within the ranges as described above, but generally the time is preferably in the range from 0.5 to 6 hours, and more preferably in the range from 0.5 to 3 hours.

After the organic silicon compound layer substantially has disappeared, the mixed aqueous solution is preferably left, being agitated, for 0.1 to 35 hours, preferably for 0.1 to 7 hours, and more preferably for 0.5 to 5 hours at a temperature in the range from 1 to 45° C., preferably in the range from 1 to 30° C., and more preferably in the range from 10 to 20° C. When a temperature of the mixed aqueous solution is less than 1° C., sometimes the water may be frozen. When the temperature is over 45° C., a portion of partial hydrolysate and/or hydrolysate of the organic silicon compound is gelated, or agglomeration of the particles easily occurs, and furthermore density of the particles becomes higher, so that the sodium aluminate hardly permeate the particles, and as a result, porous silica-based particles may not be obtained. Furthermore, when the leaving time is less than 0.1 hour, the organic silicon compound is not well hydrolyzed or not well partially hydrolyzed, and sometimes desired particles can not be obtained, or a portion of the particles is gelated. Furthermore the organic silicon compound having not been reacted yet remains, which lowers a yield of the silica-based particle precursors. When the leaving time is over 35 hours, sometimes the particles agglomerate.

In addition, the agitation should preferably be performed slowly at the rotating speed of 30 to 100 rpm. When the agitation is performed slowly, it is possible to obtain a mixed aqueous solution containing silica-based particle precursors each having a relatively tight framework.

Step (b)

In this step, silica-based particles having pores, cavities or voids inside thereof are prepared by adding an aqueous solution of sodium aluminate in a mixed aqueous solution containing the silica-based particle precursors.

Sodium aluminate is classified to sodium orthoaluminate ($Na_3AlO_3$) and sodium metaaluminate ($NaAlO_2$), and either one can be used in the present invention. However, it is preferably to use the latter sodium aluminate.

The sodium aluminate (a white crystalline solid in the ordinary state) is dissolved in water (for instance, pure water) for use. However, in stead of sodium aluminate procurable from the market, it is allowable to use an aqueous solution of sodium aluminate prepared by adding aluminum hydroxide in a solution of sodium hydroxide (namely, an aqueous solution of sodium metaaluminate). In this case, there is not specific restriction over a concentration of the aqueous solution of sodium aluminate, but generally the concentration is preferably in the range from 20 to 24% by weight as calculated in terms of $Al_2O_3$.

The sodium aluminate is added into the mixed aqueous solution, when the sodium aluminate is expressed by $Al_2O_3$ and the above organic silicon compound is expressed by $SiO_2$, at a weight ratio of $Al_2O_3/SiO_2$ being in the range from 2.5/97.5 to 20/80, preferably in the range from 3/97 to 20/80, and more preferably in the range from 3/97 to 10/90. When the weight ratio is less than 2.5/97.5, a degree of permeation or intrusion of the sodium aluminate or hydrolysate thereof into the silica-based particle precursors is low, whereby the number of pores, cavities or voids formed in the silica-based particles becomes smaller. When the weight ratio is over 20/80, sometimes the silica-based particle precursors disadvantageously dissolve and collapse.

The aqueous solution of sodium aluminate may directly be added in the mixed aqueous solution containing the silica-based particle precursors obtained from the step (a). However, when a quantity of the mixed aqueous solution is large, the aqueous solution of sodium aluminate may be added in the mixed aqueous solution after a liquid in an upper layer of the mixed aqueous solution is previously removed, by means of decantation or the like.

Addition of the sodium aluminate is preferably performed, agitating the mixed aqueous solution, for 0.01 to 1 hour, preferably for 0.01 to 0.5 hour at a temperature in the range from 5 to 45° C., preferably in the range from 5 to 30° C., and more preferably in the range from 10 to 20° C. When a temperature of the mixed aqueous solution is less than 5° C., sodium aluminate or hydrolysate thereof hardly permeate or intrude into the silica-based particle precursors. When the temperature is over 45° C., sometimes the silica-based particle precursors may dissolve and collapse. Furthermore, when the time for addition is less than 0.01 hour, the silica-based particle precursors easily dissolve and collapse. When the time is over 1 hour, it requires a long time for permeation or intrusion of the sodium aluminate or hydrolysate thereof into the silica-based particle precursors, and the number of pores, cavities or voids formed inside the obtained silica-based particles becomes smaller. The agitation is preferably performed at a rotating speed of 100 to 300 rpm.

Furthermore, after the sodium aluminate is added, the mixed aqueous solution is left, being agitated, for 0.5 to 50 hour, preferably for 3 to 15 hours at a temperature in the range from 5 to 50 degrees, preferably in the range from 5 to 30° C., and more preferably in the range from 10 to 20° C. When a temperature of the mixed aqueous solution is less than 5° C., sodium aluminate or hydrolysate thereof hardly permeate or intrude the silica-based particle precursors. When the temperature is over 50° C., sometimes the silica-based particle precursors may dissolve and collapse. Furthermore, when the leaving time is less than 0.5 hour, a degree of permeation or intrusion of sodium aluminate or hydrolysate thereof lowers, and the number of the pores, cavities or voids formed inside the obtained silica-based particles becomes smaller. When the leaving time is over 50 hours, the silica-based particle precursors may dissolve and collapse.

When the sodium aluminate is added in a mixed aqueous solution containing the silica-based particle precursors, porous silica-based particles with a low density can be obtained. The mechanism has not completely been clarified, but is presumably as described below.

As described above, it is supposed that, in the silica-based particle precursors obtained in the step (a), a plurality of silica-based seed particles or precursors thereof gather and bind to each other to form a particle body, more specifically, a spherical particle body having a micelle-like structure.

It is further supposed that, when sodium aluminate is added in a mixed aqueous solution containing the silica-based particle precursors having the structure as described above, the sodium aluminate or hydrolysate thereof permeate or intrude into the silica-based particle precursors to elute a portion of silica-based components contained in the silica-based particle precursors, thus silica-based particles having pores, cavities or voids inside thereof being formed.

In the step (b), it is possible to obtain spherical silica-based particles having pores, cavities or voids inside thereof and also with the surface (external peripheral surface) having been covered with silica-based components. Although also the reason why the covering layer is formed on a surface of each particle is still unknown, it is supposed that the covering layer is formed by polycondensation of partial hydrolysate and/or hydrolysate of the organic silicon compound adhered on the surface of the silica-based particle precursors, the partial hydrolysate and/or hydrolysate of which are ones dissolved and eluted from the inside of the silica-based particle precursors. It is recognized that the covering layer also has fine pores, but the pore size is considerably smaller than the pores, cavities and voids formed inside the particles.

Step (c)

In this step (c), silica-based particles having pores, cavities or voids inside thereof are prepared by washing and drying the silica-based particles obtained through the step (b).

At first, silica-based particles are removed from the mixed aqueous solution by decantation, filtering or the like, and the obtained silica-based particles (cake-like mass) are washed with pure water repeatedly. In this step, preferably the silica-based particles are added to and agitated in the pure water to prepare a dispersion liquid, and then the dispersion liquid is stepped with a centrifugal separator to separate the silica-based particles repeatedly.

Then the fully washed silica-based particles (the case-like mass) are dried. In this step, the silica-based particles are preferably dried for 0.5 to 12 hours at a temperature from 50 to 200° C., preferably at a temperature from 80 to 150° C. When drying is performed at a temperature less than 50° C., water and other materials contained in the mixed aqueous solution (especially water) easily remains inside the obtained silica-based particles. When the temperature is over 200° C., an organic group which is partially present at an end of the obtained silica-based particle is easily detached (although the degree of detachment varies according to an organic group which is present at the end of the organic silicon compound), and therefore when silica-based particles requiring the organic group are to be prepared, drying should preferably be performed at the temperature described above or below.

By removing water and other materials contained in the mixed aqueous solution, which are present on a surface or in pores, cavities or voids inside the particles in the process of washing and drying the particles as described above, it is possible to obtain spherical porous silica-based particles having pores, cavities or voids inside thereof.

The silica-based particles obtained as described above are preferably heated for 0.5 to 2 hours at a temperature in the range from 200 to 1100° C., preferably in the range from 500 to 1000° C. When the heating temperature is less than 200° C., sometimes silica-based particles having desired compressive strength can not be obtained, or moistures or other materials remaining inside the silica-based particles can not fully be removed. When the heating temperature is over 1100° C., sometimes the obtained silica-based particles are sintered or collapse. Furthermore, when the heating time is less than 0.5 hour, moisture or other materials inside the silica-based particles can not fully be removed. Even when heating is continued for 2 hours or more, the effect does not change, and as a result, an efficiency of producing the silica-based particles becomes lower.

With the operations as described above, it is possible to obtain spherical and porous silica-based particles with high compressive strength and having pores, cavities or voids inside thereof.

Furthermore, by classifying or grading the silica-based particles according to the necessity to divide the particles to a group of those having a small diameter and a group of those having a large diameter, or by removing either one of the groups, it is possible to obtain silica-based particles having a desired average particle diameter.

Method (2) of Producing Porous Silica-Based Particles

A second method of producing porous silica-based particles according to the present invention is used for producing porous silica-based particles with a low density, and the method comprising the steps of:

(a) preparing two-layer separated liquid consisting of a layer of an organic silicon compound expressed by the following general formula (I) and a layer of water, then adding an organic solvent, an alkali, and a surfactant into the water layer while agitating at least the water layer so that the organic silicon compound layer and the water layer are not completely mixed with each other, further hydrolyzing and/or partial hydrolyzing the organic silicon compound in the mixed aqueous solution to prepare silica-based particle precursors;

$$R^1{}_n Si(OR^2)_{4-n}$$

(I)

(wherein $R^1$ is a monad selected from an alkyl group having the number of carbon atoms from 1 to 10, an aryl group having the number of carbon atoms from 6 to 10, and an unsaturated aliphatic group having the number of carbon atoms from 2 to 10, which are allowed to contain substituent groups therein, and $R^2$ is a monad selected from a hydrogen atom, an alkyl group having the number of carbon atoms from 1 to 5, and an acyl group having the number of carbon atoms from 2 to 5, and then n is an integer from 1 to 3.)

(b) adding sodium aluminate into the mixed aqueous solution containing the silica-based particle precursors and then preparing silica-based particles having pores, cavities or voids inside the particles;

(c) washing and drying the silica-based particles, if necessary;

(d) preparing silica-based particles having at least pores, cavities or voids inside the particles by adding the silica-based particles in an alkaline aqueous solution to dissolve a part of a covering layer formed on an external peripheral surface of the silica-based particles; and (e) washing and drying the silica-based particles.

Step (a)

In step (a), silica-based particle precursors mainly composed of partial hydrolysate and/or hydrolysate of an organic silicon compound are prepared under the same conditions employed in step (a) as described above for the method (1) of producing the porous silica-based particles.

Step (b)

In step (b), silica-based particles having pores, cavities or voids inside thereof are prepared by adding sodium aluminate in a mixed aqueous solution containing the silica-based particle precursors under the same conditions as those employed in step (b) as described above for the method (1) of producing porous silica-based particles.

Step (c)

In this step (c), silica-based particles having pores, cavities or voids inside thereof are prepared by washing and drying the silica-based particles obtained in step (b) under the same conditions as those employed in the method (1) of producing porous silica-based particles according to the necessity. However, it is necessary to dissolve and remove a portion or all of a covering layer which is present on a surface (an outer periphery) of the silica-based particles in step (d), and therefore it is not advantageous to perform the heating processing at a temperature higher than 200° C.

Step (d)

In this step (d), silica-based particles having pores, cavities or voids at least inside thereof are prepared by adding the silica-based particles in an alkaline aqueous solution to dissolve a covering layer on an external peripheral surface of the silica-based particles. However, there is no specific restriction over the method of adding the silica-based particles in the alkaline aqueous solution, and it is needless to say that an alkaline aqueous solution is dripped on the silica-based particles.

There is no specific restriction over the alkaline aqueous solution so long as the covering layer can be dissolved in the alkaline aqueous solution, but it is preferable to use an aqueous solution containing hydroxide of an alkali metal such as sodium or potassium. Of these materials, it is preferable to use sodium hydroxide (NaOH) having high capability of dissolving silica-based components.

There is not specific, restriction over a concentration of the alkali, but preferably the concentration is in the range from 0.1 to 1% by weight against a weight of the aqueous solution. When the concentration is less than 0.1% by weight, the covering layer is dissolved slowly. When the concentration is over 10% by weight, the obtained silica-based particles themselves may dissolve and collapse. However, there is no specific restriction over the quantity of the alkaline aqueous solution so long as the aqueous solution contains alkali by a quantity enough to dissolve the covering layer, and the aqueous solution with the silica-based particles added therein can fully be agitated.

In this step (d), after the silica-based particles have been added in the alkaline aqueous solution, the mixture solution is preferably heated to a temperature of 10 to 50° C., and is agitated, being preserved at the same temperature, for 0.5 to 30 hours, preferably for 1 to 20 hours. When the temperature is less than 1° C., the covering layer is dissolved slowly. When the temperature is over 80° C., the obtained silica-based particles sometimes dissolve and collapse. Furthermore, when the agitation time is less than 0.5 hour, the covering layer is not dissolved sufficiently, and when the agitation is continued for 30 hours or more, sometimes the obtained silica-based particles may dissolve and collapse. The agitation is preferably performed at a rotating speed of 200 to 500 rpm.

With the operations as described above, it is possible to obtain porous silica-based particles with a portion or all of the covering layer having been dissolved. To describe more specifically, with the step (d), porous silica-based particles with high porosity can be obtained, because sodium aluminate or hydrolysate thereof, silica-based components which are hydrolysates of the organic silicon compounds or reaction products thereof remaining or present in the pores, cavities or voids of the porous silica-based particles are eluted.

The porous silica-based particles that a portion of the covering layer has been dissolved are spherical particles having dimples and/or hollows partially exposed on the surface where the pores, cavities or voids exist inside but near a surface of the particles. However, since the fine pores are formed on the covering layer as described above, the water and other materials remaining in the pores, cavities or voids inside the particles can be eluted to the outside.

On the other hand, the porous silica-based particles that all or most of the covering layer have been dissolved are spherical particles exposing the pores, cavities or voids on the surface of the particles.

Whether a portion of the covering layer, or all or most of the covering layer is to be dissolved should be selected properly according to an object of use or an application of the silica-based particles.

Step (e)

In this step (e), silica-based particles having pores, cavities or voids inside thereof are prepared by washing and drying the silica-based particles obtained from the step (d).

Under the same condition as those employed in step (c) described in the method (1) of producing porous silica-based particles, the silica-based particles can be washed and dried. When the silica-based particles are washed, however, it is preferable to remove the alkali such as sodium hydroxide used in step (d) completely using not only pure water but also an ethanol aqueous solution and the like in a case where appropriate washing is difficult due to the hydrophobic nature of the particles.

Thereby, the spherical and porous silica-based particles having at least pores, cavities or voids inside thereof can be obtained.

The silica-based particles obtained as described above are preferably heated for 0.5 to 2 hours at a temperature of 200 to 1,100° C., preferably at a temperature of 500 to 1,000° C., if necessary. When the heating temperature is less than 200° C., sometimes the porous silica-based particles having a desired compressive strength may not be obtained, and when the heating temperature is over 1,100° C., the obtained silica-based particles may be sintered or collapse. Further, when the heating time is less than 0.5 hours, moisture or other materials remaining inside the obtained silica-based particles can not be fully removed, and even when the heating time continues for 2 hours or more, the effect of the heating does not change, and as a result, an efficiency of producing the silica-based particles becomes lower.

By the operations described above, it is possible to obtain the spherical and porous silica-based particles having at least pores, cavities or voids inside thereof and also having high compressive strength.

Furthermore, by classifying or grading the silica-based particles according to the necessity to divide the particles to a group of those having a small diameter and a group of those having a large diameter, or by removing either one of the groups, it is possible to obtain silica-based particles having a desired average particle diameter.

Method of Producing Porous Silica-Based Particles with a Coating Layer

Porous silica-based particles (dried or heated) obtained from the method (1) of producing porous silica-based particles and the method (2) of producing porous silica-based particles can be used as they are, but also they can be used after the surface is coated with a desired organic compound and/or inorganic compound.

Typical examples of the coating method will be described as below: one example is a method in which a surface of the silica-based particle is coated with an inorganic compound or a hydrolysate thereof by adding a solution prepared by dissolving or dispersing an inorganic compound in an organic solvent, water and the mixture thereof to a suspension prepared by suspending or dispersing the silica-based particles in an organic solvent, water and the mixture thereof; and another example is a method in which the a surface of silica-based particles are coated with an organic compound or a polymer thereof by adhering the organic compound to the surface and then melting at least a portion of the organic compound adherent to the surface of the particles.

Coating Method with an Inorganic Compound

In a representative example of the method of coating a surface of the porous silica-based particle with an inorganic compound, a solution prepared by dissolving or dispersing a silicic acid solution or an organic silicon compound is added to a suspension in which the silica-based particles are suspended or dispersed to coat a surface of the silica-based particle with an inorganic compound such as silicon components or the like.

This method is employed to coat a surface (a spherical surface) of the silica-based particle with the inorganic compound or hydrolysate thereof, and is applicable for sealing a surface of the particle or for increasing the compressive strength of the particles.

It is advantageous to use, like the silicic acid solution described above, an aqueous solution of silicate such as silicate of alkali metal or silicate of organic base processed with a cation exchange resin for de-alkalization.

The silicates available in this step include, but not limited to, silicate of alkali metal such as sodium silicate (water glass), potassium silicate, and silicate of organic base such as quaternary ammonium silicate.

Among these silicic acid solutions, it is desirable to use a silicic acid solution having pH 2 to 4, preferably pH 2 to 3, and a silica concentration of 0.1 to 8% by weight, preferably 1 to 6% by weight (in terms of $SiO_2$). When a silicic acid solution having the pH value of less than 2 is to be produced, it is required to add an unnecessary acid from the outside, but it is not desirable that silica-based particles are prepared or coated with such a silicic acid solution produced as described above because desired silica-based particles can not be obtained or the acid component added from the outside remains inside of the particles as impurities. Further, when pH is more than 4, since the silicic acid solution becomes unstable and is easy to gelatinize, it is difficult to stably coat a surface of the silica-based particles. Further, when the silica concentration is less than 0.1% by weight, a production yield of the silica-based particles coated with a silicon component becomes lower, and when the silica concentration is more than 8% by weight, the silica-based particles may not be coated stably due to the lower stability of the silicic acid solution.

Further, ethyl silicate, methyl silicate and an organic silicon compound expressed by the general formula (I) described above are used as an organic silicon compound. Among these materials, it is preferable to use an organic silicon compound such as ethyl silicate, and methyl silicate.

The silicic acid solution or the organic silicon compound is preferably dissolved or dispersed in an organic solvent, water or the mixture thereof, and then added into a suspension prepared by suspending or dispersing the silica-based particles in an organic solvent, water or the mixture thereof. However, instead of this method of addition, a suspension prepared by suspending or dispersing the silica-based particles therein may be added into a solution in which the silicic acid solution or the organic silicon compound is dissolved or dispersed.

It is preferable that the silicic acid solution or the organic silicon compound is added to the silica-based particles by adjusting the quantity so that a thickness of a coating layer of a silicon component coated on a surface of the silica-based particles is in the range from 0.005 to 2 μm, preferably in the range from 0.01 to 0.5 μm.

When the silicic acid solution is used, it is desirable that the silicate is added to an aqueous solution with the silicic acid solution dissolved therein with agitation to prepare a solution having pH 7.5 to 12, preferably pH 8 to 11, and then the solution is added to a suspension prepared by suspending or dispersing the silica-based particles in water with agitation after the solution is heated to a temperature of 20 to 98° C., preferably a temperature of 40 to 98° C. When pH of the solution is less than 7.5, it is difficult to coat a surface of the silica-based particle with a silicon component, and when pH of the solution is more than 12, the silica-based particles may dissolve. Furthermore, when the heating temperature is less than 20° C., a surface of the silica-based particles may not be coated with a silicon component or the coating speed may be slow. Furthermore, when the heating temperature is more than 98° C., water is easily evaporated if it is used as a solvent, and as a result, the coated surface (a thickness of the coating layer) is apt to be uneven.

In addition, it is desirable to use the same silicate as that used for preparing the silicic acid solution.

It is desirable that a processing time after adding the aqueous solution containing the silicic acid solution to the suspension containing the silica-based particles is for 0.5 to 12 hours, preferably for 1 to 6 hours, although the time varies according to a thickness of a coating layer made of a silicon component coated on a surface of the silica-based particles. When the processing time is less than 0.5 hour, a surface of the silica-based particle is not sufficiently coated with the silicic acid solution (a silicon component), and even when the processing time is more than 12 hours, the effect does not change, and as a result, an efficiency of producing the silica-based particles becomes lower.

It is desirable that, when ethyl silicate is used as the organic silicon compound described above, an organic solvent such as alcohol which can be mixed with water and ethyl silicate homogeneously is used, and pH of the solution is adjusted to 7.5 to 12, and then a hydrolytic reaction of the ethyl silicate occurs at a temperature of 20 to 98° C., preferably a temperature of 40 to 98° C. When pH of the solution is less than 7.5, it is difficult to promote the hydrolytic reaction, and when pH of the solution is more than 12, the silica-based particles may dissolve. Further, when the heating temperature is less than 20° C., a surface of the silica-based particles may not be coated with a silicate component or even when coated, the coating speed may be slow. Furthermore, when the heating temperature is more than 98° C., the solvent is easily evaporated, and as a result, a coated surface (for instance, the thickness of a covering layer) is apt to be uneven.

Then, the silica-based particles are preferably separated with a centrifugal separator from the solution, and pure water is added with agitation to the obtained cake-like mass obtained from the centrifugal separation to prepare a dispersion of the silica-based particles, and further the silica-based particles (the cake-like mass) are separated repeatedly with a centrifugal separator.

When the silica-based particles sufficiently washed as described above are dried for 0.5 to 12 hours at a temperature in the range from 50 to 200° C., preferably in the range from 80 to 150° C., silica-based particles having pores, cavities or voids inside thereof and with the surface thereof coated with a silicon component can be obtained. When a drying temperature is less than 50° C., moistures or other materials remaining inside the silica-based particles can not fully be removed, and when the drying temperature is more than 200° C., an organic group partially present at an end of the obtained silica-based particle is easily detached (although the degree of detachment varies according to an organic group present at the end of the organic silicon compound), and therefore, when silica-based particles requiring the organic group (having a hydrophobic nature, for instance) are to be prepared, drying should preferably be performed at the temperature described above or below.

The silica-based particles obtained as described above are preferably heated for 0.5 to 2 hours at a temperature in the range from 200 to 1,100° C., preferably a temperature of 500 to 1,000° C., if necessary. When the heating temperature is less than 200° C., sometimes the porous silica-based particles having a desired compressive strength may not be obtained, and when the heating temperature is more than 1,100° C., the obtained silica-based particles may be sintered or collapse. Further, when the heating time is less than 0.5 hours, moisture or other materials remaining inside the obtained silica-based particles can not be fully removed, and even when the heating time continues for more than 2 hours, the effect of the heating does not change, and as a result, an efficiency of producing the silica-based particles becomes lower.

With the operations as described above, it is possible to obtain spherical and porous silica-based particles with high compressive strength and having pores, cavities or voids inside thereof and coated with a surface (an outer peripheral) thereof with a silicon component such as silica.

Furthermore, by classifying or grading the silica-based particles according to the necessity to divide the particles to a group of those having a small diameter and a group of those having a large diameter, or by removing either one of the groups, it is possible to obtain silica-based particles having a desired average particle diameter.

Coating Method with an Organic Compound

A representative example of coating a surface of the porous silica-based particles with an organic compound is disclosed in Japanese Patent Laid-Open Publication No. H08-328922 previously filed by the present applicant. In this example, by depositing an organic compound like fine particles on surfaces of the silica-based particles and furthermore melting a portion of the deposited organic compound, surfaces of the silica-based particles are coated with the organic compound.

In this method, surfaces of the porous silica-based particles are coated with the organic compound, and this method is advantageously applicable for sealing surfaces of the particles or for improving the compressive strength or elastic modulus of the particles.

There is no specific restriction over the organic compound used in this process, but preferably the organic compound is thermoplastic resins with a glass transition point of 200° C. or below, or thermoplastic resins with a curing temperature of 200° C. or below. Of these materials, it is preferable to use a thermoplastic synthetic resin selected from the group consisting of a methyl methacrylate resin, an acryl-styrene copolymer resin, or a mixture thereof.

There is no specific restriction over a form of the organic compound so long as the compound has a form like fine particles, but preferably the organic particles have a spherical form. An average diameter "d" of the particles is preferably D/5 or below, and preferably in D/7 or below wherein D denotes an average diameter of the porous silica-based particles, and to described in further details, the average diameter "d" is in the range from 0.01 to 2 μm, and more preferably in the range from 0.01 to 1 μm. When the average diameter "d" of the organic compound is over D/5, sometimes the organic compound is not deposited homogeneously on surfaces of the porous silica-based particles, or even when the porous silica-based particles are deposited on surfaces of the porous silica-based particles, sometimes the organic particles drop off from the surfaces of the particles.

Particles of the organic compound are mixed with the porous silica-based particles to be deposited on surfaces of the silica-based particles, and then the porous silica-based particles with the organic compound deposited thereon are put in a container such as a ball mill to give impacts to the surfaces of the silica-based particles. Then at least a portion of the organic compound is melted so that the particles of the organic compound are coupled to each other and a tightly fixed on surfaces of the silica-based particles. Particles of the organic compound are either in the state where the particles preserve the original form and adjoining ones couple to each other, or in the state where a portion or most of the particles are melted to form a thin film.

The ball used as a ball mill are required to be a spherical one having a relatively large diameter and a heavy weight (such as a metal ball made of stainless steel), and there are no other specific restriction over the ball, but the diameter is preferably in the range from 1 to 30 mm.

Furthermore, fine particles of the organic compound are mixed with the porous silica-based particles and are deposited on surfaces of the silica-based particles, and then are put and slightly mashed up in a mortar which is previously heated. With the operations described above, at least a portion of the organic compound can be melted and deposited on the surfaces of the silica-based particles. Also in this case, particles of the organic compound are either in the state where the particles preserve the original form and adjoining ones couple to each other, or in the state where a portion or most of the particles are melted to form a thin film.

With the operations as described above, it is possible to obtain spherical silica-based particles having pores, cavities or voids inside thereof and with the surface (outer peripheral surface) coated with an organic compound, and further being excellent in the compressive strength and the elastic modulus.

Furthermore, if required, by subjecting the silica-based particles to classifying or grading to divide the particles to a group of those having a small diameter and a group of those having a large diameter or to remove either one of the groups, it is possible to obtain silica-based particles having a desired average diameter.

Porous Silica-Based Particles

The porous silica-based particles according to the present invention are obtained as described above, and an average diameter of the particles is in the range from 1 to 15 µm, and in addition the compacted bulk density is in the range from 0.20 to 0.76 g/cm$^3$, and preferably in the range from 0.25 to 0.63 g/cm$^3$. An oil absorption rate of the porous silica-based particles is in the range from 0.51 to 1.55 ml/g, and preferably in the range from 0.63 to 1.53 ml/g, and furthermore the compressive strength is preferably in the range from 4 to 100 kgf/mm$^2$.

With the method of producing porous silica-based particles according to the present invention, it is possible to obtain porous silica-based particles with the average diameter in the range from 1 to 15 µm, preferably in the range from 2 to 10 µm. Since a value of the desired average diameter substantially varies according to an application of the silica-based particles, a size of the silica-based particles must be controlled and adjusted according to the necessity by changing the operating conditions or other parameters in the preparing step (a). Although it is possible to produce silica-based particles with the average diameter of less than 1 µm, it is not always possible to obtain porous silica-based particles with a low particle density, and it is difficult to obtain porous silica-based particles with the average diameter of over 15 µm. Although the average diameter of the silica-based particles is generally decided by an average diameter of the silica-based particle precursors, it is difficult to obtain silica-based particles with the average diameter of more than 15 µm even when the operating conditions in the step (a) are changed.

With the present invention, it is possible to obtain porous silica-based particles with the compacted bulk density in the range from 0.20 to 0.76 g/cm$^3$, and preferably in the range from 0.25 to 0.60 g/cm$^3$. A density of the porous silica-based particles is extremely low, and the particles are generally hydrophobic, by which most of the particles are floated in water. Furthermore, because diameters of pores, cavities or voids formed inside the particles are relatively large, and therefore it is difficult to accurately measure an apparent density of the particles by the mercury method or the like known in the conventional technology. So the oil absorption rate of the particles was measured with the method described below, and it was found that the oil absorption rate was in the range from 0.51 to 1.55 ml/g, and preferably in the range from 0.63 to 1.53 ml/g. To describe more specifically, the porous silica-based particles having a coating layer on the surfaces thereof have the oil absorption rate in the range from 0.63 to 1.32 ml/g, and more preferably in the range from 0.63 to 0.90 ml/g. The porous silica-based particles not having a coating layer on the surfaces have the oil absorption rate in the range from 0.70 to 1.53 ml/g, and more preferably in the range from 0.74 to 1.53 ml/g. The observation result indicates that, although there are fine pores in the coating layer, a density of the coating layer is substantially higher than that inside the particles and also a density inside the particles is slightly higher than that of the silica-based particles not having the coating layer, and therefore the oil absorption rate tends to become lower. Porosity of the particles was calculated based on the values described above, and it was found that the porosity was generally in about 20 to about 70%.

Furthermore, with the present invention, it is possible to obtain spherical and porous silica-based particles with the compressive strength in the range from 4 to 100 kgf/mm$^2$. More specifically, in a case of silica-based particles with high porosity, the compressive strength of the silica-based particles having been subjected only to drying is generally in the range from 4 to 15 kgf/mm$^2$, while the compressive strength of the silica-based particles having been heated at a relatively low temperature (for instance, at 500° C.) is generally in the range from 15 to 30 kgf/cm$^2$. Moreover, the compressive strength of the silica-based particles having been heated at a relatively high temperature (for instance, at 1000° C.) is generally in the range from 30 to 100 kgf/cm$^2$. For the reasons as described above, whether the porous silica-based particles is to be heated, or at which temperature the silica-based particles is to be heated, should preferably be decided according to an object of use and an application of the silica-based particles.

As described above, the reason why the compressive strength of the porous silica-based particles according to the present invention is relatively high is that inside of each particle is formed with a framework having the —Si—O—Si— structure originated from hydrolysate of the organic silicon compound. As far as observed in the silica-based particles (with the covering layer on the surfaces thereof having been removed) prepared in the method (2) of producing the porous silica-based particles, it can be considered that aluminum components originated from the sodium aluminate added therein are not involved in formation of the framework, because the weight ratio of $Al_2O_3$ versus $SiO_2$ is 0.5% or less by weight when the aluminum components are represented by $Al_2O_3$ and the silica-based particles are represented by $SiO_2$.

The average diameter of the silica-based particles according to the present invention is obtained by measuring particle diameters of 10000 particle samples acquired from a group of the silica-based particles with the Coulter counter (produced by Beckman Coulter Inc.) and averaging the measured values.

The compacted bulk density, the oil absorption rate, and the compressive strength are measured as described below.

Compacted Bulk Density

Particle samples are acquired by 2 to 3 grams, and the weight is measured. Then the particle samples are put in a 25-ml measuring cylinder, and tapping is performed until the particle samples are filled in the measuring cylinder at the maximum density, and the volume is read. Then the compacted bulk density is calculated through the following equation.

Compacted bulk density (g/cm$^3$)=Weight of particle samples (g)/Filled volume at highest density (cm$^3$)

Oil Absorption Rate

An oil absorption rate of the particle samples is measured based on the pigment testing method JIS-K5101. Since this method is described in JIS-K5101, the detailed are not described here. In this method, an oil absorption rate (ml/100 g) is obtained by measuring a quantity of boiled flax seed oil absorbed in the particle samples. In this specification, a unit of the oil absorption rate is expressed as ml/g.

Compressive Strength

Particle samples are placed on a compressive strength measuring device (such as MCTM-200 produced by Shimazu Corporation) and a pressure is gradually loaded to the particle samples, and a compressive strength (compressive breaking strength) is measured at a point of time when the particles are crushed. More specifically, assuming that the load-velocity constant is 1, measurement is performed while changing the load-velocity in the range from 0.029 to 0.27 gf/sec.

Applications of the Porous Silica-Based Particles

The porous silica-based particles obtained by the first and second methods (1 and 2) of producing porous silica-based particles according to the present invention (those dried or heated) have the excellent capability of absorbing or adsorbing inorganic compounds and/or organic compounds dissolved or dispersed in an organic solvent, water, or a mixture solution thereof, so that, when the compounds are absorbed or adsorbed in the particles, functions or effects, which the compounds originally have, are preserved and achieved for a long term in the stable conditions. Furthermore, when a surface of the silica-based particle is coated with a thin film made of an inorganic compound such as a silicon component or an organic compound such as a polymer compound, it is possible to prevent the inorganic compound and/or the organic compound absorbed or adsorbed in the particles from being eluted to the outside. On the other hand, when the silica-based particles coated with a thin layer (including those mixed with matrix components, organic compounds or the like) are heated, immersed in a solution, or compressed mechanically, the coating layer may melt, dissolve, or collapse, and the materials absorbed or adsorbed in the particles can be eluted to the outside within a short period of time, and therefore the functions and effects of the absorbed or adsorbed materials can effectively be achieved. Namely, the porous silica-based particles according to the present invention can advantageously be used for micro-capsulating the materials.

Any known method can be used for having the inorganic compounds and/or the organic compounds absorbed or adsorbed in the porous silica-based particles, and a representative method available for this purpose are as described below.

At first, a material including one or more component(s) selected from inorganic metal compounds such as silicon, titanium, cobalt, nickel, aluminum, zirconium, iron, antimony, tin, indium; or organic metal compounds or organic compounds such as hydrocarbons, amines, pigments, dyes, perfumes to be absorbed or adsorbed in the porous silica-based particles is prepared, as it is necessary, by dissolving or dispersing the component(s) in a desired solution (such as water or an organic solvent), with further adjustment of the concentration at a suitable level, for instance, by diluting the solvent.

Then, the material is slowly added onto the porous silica-based particles so that the material is absorbed or adsorbed in the particles by the quantity equivalent to the pore volume of the particles. Alternatively, the material (by a quantity equivalent to the pore volume of the particles) and the porous silica-based particles are put in a container and the container is vacuumed so that the material is absorbed or adsorbed (impregnated) in the particles. Furthermore, sometimes the material absorbed or adsorbed in the particles are heated (for instance, for drying) or hydrolyzed according to a purpose of use. Thus obtained products may be subjected to processing for separating the material having not absorbed or adsorbed yet, or for washing according to the necessity.

As a method of coating a surface of the silica-based particle having absorbed or adsorbed therein the inorganic materials and/or organic materials with an inorganic compound or an organic compound, the method similar to that described in "Method of producing porous silica-based particles with a coating layer" above may be employed.

Furthermore, the porous silica-based particles, especially the porous silica-based particles having a coating layer on a surface (outer peripheral surface) thereof according to the present invention have a number of pores, cavities or voids inside thereof, and the refractive index is in the range from 1.10 to 1.40, more specifically in the range from 1.15 to 1.35. So the silica-based particles according to the present invention have specific physical properties.

Because of the features as described above, when the porous silica-based particles are mixed with a matrix component for forming a coating film, the porous silica-based particles can be used for such an application of forming a coating film with a low refractive index, a coating film with a low dielectric constant, a coating film with a low reflectance, and the like.

The matrix components described above include, but not limited to, resins for painting which have been used for the purpose such as a polyester resin, an acrylic resin, a urethane resin, a vinyl chloride resin, an epoxy resin, a melamine resin, a fluorine resin, a silicon resin, a butyral resin, a phenol resin, a vinyl acetate resin, a ultraviolet curing resin, an electron beam curing resin, an emulsion resin, a water-soluble resin, a hydrophilic resin, a mixture of the resins, copolymer or denatured ones of the resins, and the like; silicon compounds expressed by the general formulas (II), (III), (IV) and the like; and mixtures and furthermore hydrolysates and/or partial hydrolysates of the silicon compounds.

$$X_n Si(OR)_{4-n} \qquad (II)$$

$$X_n SiX'_{4-n} \qquad (III)$$

(wherein X represents a hydrogen atom, a fluorine atom, an alkyl group having 1 to 8 carbon atoms, fluorine-substituted group, an aryl group, or a vinyl group; R represents a hydrogen atom, or an alkyl group having 1 to 8 carbon atoms, an aryl group, or a vinyl group; and X' represents a halogen atom, and then n is an integer from 0 to 3.)

(IV)

(wherein $R^1$, $R^2$ and $R^3$ each represent a hydrogen atom or an alkyl group having 1 to 8 carbon atoms respectively.)

When a resin for painting is used as the matrix component, the porous silica-based particles are directly dispersed in an organic solvent selected from the group consisting of alcohols, ethers, ketones, esters, or hydrocarbons, or dispersed in water, and then water contained in the particles is substituted with the organic solvent using a rotary evaporator or the like to prepare an organic solvent solution in which the silica-based particles are dispersed, and then the organic solvent solution is mixed with the resin for a paint (dissolved in the organic solvent, if necessary) to obtain a coating liquid for painting or the like.

When a silicon compound is used as the matrix component, the porous silica-based particles or a dispersion of the silica-based particles obtained by dispersing the silica-based particles in water is mixed in a mixture solution containing partial hydrolysate and/or hydrolysate, and the partial hydrolysate and/or hydrolysate are further hydrolyzed according to the necessity, and then water contained in the particles is substituted with an organic solvent selected from alcohols, ethers, ketones, esters, hydrocarbons, and the like by using a rotary evaporator or the like to obtain a coating liquid for forming a coating film in which the porous silica-based particles and the hydrolysate are dispersed in the organic solvent and the like.

The coating liquid for forming a coating film is applied, for use, on a plastic sheet, a plastic film, a plastic lens, a plastic panel each made of such a materials as a polycarbonate, an acrylic resin, PET, TAC or the like, and furthermore on a glass plate, a semiconductor substrate, a liquid crystal plate, a cathode ray tube, a fluorescent indicator panel, or the like.

This coating liquid is applied on a substrate by any known method such as the dip method, the spray method, the spinner method, and the roll coat method and then is dried, and is furthermore cured by heating or irradiation of ultraviolet ray, if necessary, to form a desired coating film such as a coating film with a low refractive index, a coating film with a low dielectric constant, a coating film with a low reflectance, and the like.

This coating film may be used singly, but also may be used in some applications in combination with a protection film, a hard coating film, a flattening film, a film with high refractive index, an insulating film, a conductive resin film, a conductive metal particle film, a conductive metal oxide film, and a primer film or the like. When the coating film is used in combination with other coating film, the coating film is not always required to be formed on an outermost surface.

When the silica-based particles are used for forming a coating film having a low refractive index, the mixing weight ratio $S_x/M_x$ is in the range from 0.1/9.9 to 9/1, and preferably in the range from 1/9 to 8/2, wherein $S_x$ represents silica-based particles and the $M_x$ represents a matrix component. When the weight ratio is less than 1/99 (0.1/9.9), the effect of lowering a refractive index of the coating film can not be obtained by addition of the particles. On the other hand, when the weight ratio is over 9/1, strength of the coating film or adhesion to the substrate lowers, which makes it impossible to use the coating film for a practical purpose.

A refractive index of a coating film formed on a surface of the matrix is generally in the range from 1.13 to 1.44, although the refractive index varies according to a mixing ratio between the silica-based particles and the matrix component or a refractive index of the matrix component. The coating film has a low refractive index, because the silica-based particles according to the present invention have a lower refractive index as compared to that of any known silica-based particles.

When the silica-based particles are used for forming a coating film having a low dielectric constant, a mixing weight ratio $S_x/M_x$ should preferably be in the range from 1/9 to 9/1, preferably in the range from 2/8 to 8/2, and more preferably in the range from 3/7 to 7/3, wherein $S_x$ represents silica-based particles and the $M_x$ represents a matrix component. When the weight ratio is less than 1/9, it is difficult to form a coating film having a dielectric constant of 3.0 or below. When the weight ratio is over 9/1, strength of the coating film or adhesiveness to a substrate lowers, and the coating film can not be used for a practical purpose.

A dielectric constant of a coating film formed on a surface of the substrate is generally 3.5 or below, and more specifically 3.0 or below, although the dielectric constant varies dependent upon a mixing ratio between the silica-based particles and the matrix component or a dielectric constant of the matrix component used in this step.

When a resin for paint is used as the matrix component, a dielectric constant of the obtained coating film has a dielectric constant of 3.5 or below, and more specifically in the range from 1.8 to 3.0. When a silicon compound such as an organic silicon compound is used as the matrix component, a dielectric constant of the obtained coating film is 3.5 or below, and more specifically in the range from 1.8 to 3.0. The silica-based particles having pores, cavities or voids inside thereof largely contribute to lowering of a dielectric constant of the coating film.

When the silica-based particles are used for forming a coating film having a low reflectance, the coating film is preferably formed on a surface of a substrate having a high refractive index or a surface of a coating film having a high refractive index formed on the substrate. For instance, when a refractive index of the substrate is 1.6 or below, a coating film having a high refractive index obtained by applying a coating liquid containing metal oxide particles, a matrix component and the like is formed on a surface of the substrate, and furthermore the coating film having a low refractive index is formed. In this case, a difference between the refractive indexes becomes larger, and therefore a substrate with a coating film excellent in the antireflection capability can be obtained.

Furthermore, when the silica-based particles are used, a coating film which is required to have high strength, high transparency and the like can easily be formed on the substrate.

Furthermore, the porous silica-based particles, especially the porous silica-based particles having pores, cavities or voids also on a surface thereof have a larger specific surface area, and therefore the particles can advantageously be used for application of removing impurities contained in a gaseous material or a material in the form of a liquid. In this case, the porous silica-based particles can be used as they are as an adsorbent for directly adsorbing the impurities, but an active metal or the like may be carried on a surface thereof for promoting adsorption or decomposition of the impurities. Furthermore, the excellent catalytic function is provided when a suited material is selected and carried thereon.

The present invention is described more specifically with reference to the examples. It is to be noted that the present invention is not limited to the examples described below.

Example 1

Preparation of Porous Silica-Based Particles (A)

Step (a)

3290.4 grams of pure water is put in a container with the inner capacity of 5 litters, and the pure water was cooled to about 0° C. (a temperature close to 0° C. at which water is not frozen) with agitation at the rotating speed of 50 rpm. Then 375.0 grams of vinyl trimethoxysilane (produced by Shin-Etsu Chemical CO., Ltd.) with the temperature previously adjusted to about 0° C. was quietly added to the pure water to prepare a two-layer separated liquid consisting of a vinyl trimethoxysilane layer (upper) and a water layer (lower). Furthermore, the two-layer separated solution was cooled with agitation at the rotating speed of 50 rpm until the temperature of the vinyl trimethoxysilane layer was adjusted to about 1° C.

Also, 41.9 grams of pure water was added in a container with the inner capacity of 100 cc, and 1.05 grams of n-butyl alcohol (produced by Kanto Chemical. CO., Ltd.) and 0.4 grams of ammonia water with the concentration of 28% by weight were added to the pure water with agitation at the rotating speed of 100 rpm, and further 3.75 grams of alkyl diphenylether sodium disulfonate (produced by Kao Corporation) as an anion-based surfactant was added to the mixture solution. Furthermore, the mixture solution was cooled to about 5° C. with agitation at the rotating speed of 100 rpm.

Then, the mixture solution was added over 50 seconds to the water layer, while agitating the water layer at a rotating speed of 50 rpm, so that the organic silicon compound layer which is an upper layer and the water layer which is a lower layer were not mixed with each other completely. The addition of the mixture solution was performed by setting a capillary tube into the bottom of the water layer, and flowing out the mixture solution from a nozzle at the tip of the capillary tube. Then, the water layer (i.e. the mixed aqueous solution) with the mixture solution added therein was preserved at the temperature of about 1° C., and agitation was continued for about 4.5 hours at the rotating speed of 50 rpm until the hydrolysis reaction of the organic silicon compound proceeded and the organic silicon compound layer disappeared. In this step, pH of the water layer (i.e. the mixed aqueous solution) was about 8.8 on average.

Then, the mixed aqueous solution with the organic silicon compound layer having disappeared was left for 3 hours at the temperature of about 15° C. with agitation at the rotating speed of 50 rpm.

With the operation described above, a mixed aqueous solution was obtained, the solution of which contains the silica-based particle precursors A-(a) comprising partial hydrolysate and/or hydrolysate of vinyl trimethoxysilane in the water layer (i.e. the mixed aqueous solution).

Step (b)

42.7 grams of an sodium aluminate aqueous solution containing sodium metaaluminate by 22.12% by weight as calculated in terms of $Al_2O_3$ (produced by Catalysts & Chemicals Industries Co., Ltd.) was added to 3712.5 grams of the mixed aqueous solution obtained in step (a) above over 60 seconds with agitation at the rotating speed of 200 rpm. The weight ratio ($Al_2O_3/SiO_2$) was 5/95, wherein $Al_2O_3$ represents the sodium aluminate and $SiO_2$ represents the organic silicon compound (vinyl trimethoxysilane) used in step (a) above.

The aqueous solution of sodium aluminate was added to a top surface of the mixed aqueous solution. During addition, the mixed aqueous solution was preserved at the temperature of about 18° C.

Then the mixed aqueous solution was left for 15 hours at the temperature of about 18° C. with agitation at the rotating speed of 200 rpm.

With the operation described above, a portion of silica-based components contained in the silica-based particle precursors was eluted, and a mixed aqueous solution containing the silica-based particles A-(b) having pores, cavities or voids inside thereof was obtained.

Step (c)

3643 grams of the mixed aqueous solution obtained in step (b) was subjected to centrifugation with a centrifugal separator (produced by Kokusan Chemical CO., Ltd.) to separate the silica-based particles. Pure water was added to the cake-like mass obtained above, and the mixture solution was agitated to prepare a dispersion. The centrifugation described above was repeated 3 times. The silica-based particles (cake-like mass) sufficiently washed as described above was dried for 12 hours at the temperature of 110° C.

With the operation described above, 63 grams of porous silica-based particles A-(c) was obtained, and it is observed that the porous silica-based particle has pores, cavities or voids inside thereof with the surface covered with the covering layer containing silica-based components.

Example 2

Preparation of Porous Silica-Based Particles (B)

Step (a)

3290.0 grams of pure water was put in a container with the inner capacity of 5 litters, and the pure water was cooled to about 0° C. (a temperature close to 0° C. at which the water is not frozen) with agitation at the rotating speed of 50 rpm. Then, 375.0 grams of methyl trimethoxysilane (produced by Shin-Etsu Chemical Co., Ltd.) with the temperature previously adjusted to about 5° C. was quietly added to the pure water to prepare a two-layer separated solution consisting of a methyl trimethoxysilane layer (upper layer) and a water layer (lower layer). Furthermore, the two-layer separated solution was cooled with agitation at the rotating speed of 50 rpm until the temperature of the methyl trimethoxysilane layer was adjusted to about 1° C.

Also, 69.8 grams of pure water was added in a container with the inner capacity of 100 cc, and 1.75 grams of n-butyl alcohol (produced by Kanto Chemical Co., Ltd.) and 0.7 grams of ammonia water with the concentration of 28% by weight were added to the pure water with agitation at the rotating speed of 100 rpm, and furthermore 3.75 grams of alkyl diphenylether sodium disulfonate (produced by Kao Corporation) as an anion-based surfactant was added to the mixture solution. The mixture solution was cooled to about 5° C. with agitation at the rotating speed of 100 rpm.

Then, the mixture solution was added to the water layer over 100 seconds with agitation at the rotating speed of 50 rpm, so that the organic silicon compound layer (i.e. the upper layer) and the water layer (i.e. the lower layer) were not completely mixed with each other. The addition was performed by setting a capillary tube into the bottom of the water layer and flowing out the mixture solution from a nozzle at the tip of the capillary tube. Then, the water layer (i.e. the mixed aqueous solution) with the mixture solution added therein was preserved at the temperature of about 0 to 1° C., and agitation at the rotating speed of 50 rpm was continued for about 4.5 hours until the hydrolysis reaction of the organic silicon compound proceeded and the organic silicon compound layer disappeared. In this step, pH of the water layer (i.e. the mixed aqueous solution) was about 9.2 on average.

Furthermore, the mixed aqueous solution with the organic silicon compound layer having disappeared was left for 2 hours at the temperature of about 15° C. with agitation at the rotating speed of 50 rpm.

With this operation described above, a mixed aqueous solution was obtained, the solution of which contains the silica-based particle precursors B-(a) comprising partial hydrolysate and/or hydrolysate of methyl trimethoxysilane in the water layer (i.e. the mixed aqueous solution).

Step (b)

42.7 grams of aqueous solution of sodium aluminate containing sodium metaaluminate by 22.12% by weight as calculated in terms of $Al_2O_3$ (produced by Catalysts & Chemicals Industries Co., Ltd.) was added over 60 seconds to 3741.4 grams of the mixed aqueous solution obtained in step (a) above with agitation at the rotating speed of 200 rpm. The weight ratio ($Al_2O_3/SiO_2$) was 5/95, wherein $Al_2O_3$ represents the sodium aluminate and $SiO_2$ represents the organic silicon compound (methyl trimethoxysilane).

Addition of the aqueous solution of sodium aluminate was performed from a top surface of the mixed aqueous solution. During this operation, a temperature of the mixed aqueous solution was preserved at about 18° C.

Furthermore, this mixed aqueous solution was left for 15 hours at the temperature of about 18° C. with agitation at the rotating speed of 200 rpm.

With the operation described above, a portion of silica-based components contained in the silica-based particle precursors was eluted, and a mixed aqueous solution containing the silica-based particles B-(b) having pores, cavities or voids inside thereof was obtained.

Step (c)

3643 grams of the mixed aqueous solution obtained in step (b) above was processed in a centrifugal separator (produced by Kokusan Chemical Co., Ltd.) to separate the silica-based particles. Furthermore, pure water was added to the cake-like mass with agitation to prepare a dispersion, and the centrifugation as described above was repeated three times. The silica-based particles (cake-like mass) sufficiently washed as described above was dried over 12 hours at the temperature of 110° C.

With the operation described above, 79 grams of porous silica-based particles B-(c) was obtained, and it is observed that the porous silica-based particle has pores, cavities or voids inside thereof with the surface covered with the covering layer containing silica-based components.

Step (d)

30 grams of the silica-based particles B-(c) obtained in step (c) above was added in 225 grams of an aqueous solution of sodium hydroxide with the concentration of 1% by weight (Kanto Chemical CO., Ltd.), and then 25 grams of ethanol was added in the mixture solution, and the resultant mixture solution was heated to 50° C. with agitation at the rotating speed of 150 rpm. Furthermore the mixture solution was left for 2 hours at the temperature with agitation at the rotating speed of 150 rpm.

With this operation described above, an alkaline aqueous solution (1) containing silica-based particles was obtained, and in the silica-based particles B-(d1), a portion of the silica-based components (covering layer) covering surfaces of the silica-based particles was dissolved.

30 grams of silica-based particles B-(c) obtained in step (c) was added in 225 grams of an aqueous solution of sodium hydroxide with the concentration of 3% by weight, and then 25 grams of ethanol was added in the mixture solution, and the resultant mixture solution was heated to 50° C. with agitation at the rotating speed of 150 rpm. Furthermore, the mixtures solution was left for 4 hours at the temperature with agitation at the rotating speed of 150 rpm.

With the operations described above, the alkaline aqueous solution (2) was obtained, and in the aqueous solution (2) contained silica-based particles B-(d2), all of the silica-based component (covering layer) covering surfaces of the silica-based particles was dissolved.

Step (e)

The silica-based particles B-(d1) and B-(d2) contained in the alkaline aqueous solutions (1) and (2) above respectively were separated with filtration, and the particles were fully washed with pure water, and then were dried over 12 hours at the temperature of 110° C.

With the operation described above, 18 grams of porous silica-based particles B-(e1) and 5 grams of porous silica-based particles B-(e2) were obtained, and in the silica-based particles B-(e1), a portion of the covering layer covering surfaces of the particles remained as having not been fully dissolved, while, in the silica-based particles B-(e2), all of the covering layer was dissolved.

Heating Process

The porous silica-based particles B-(e1) and B-(e2) were heated for 2 hours at the temperature of 500° C. in the atmospheric air respectively.

With the heating process described above, the silica-based particles B-(s1) and B-(s2) having pores, cavities or voids at least inside thereof were obtained.

Furthermore, the porous silica-based particles B-(e2) were heated for 2 hours at the temperature of 1000° C. in the atmospheric air.

With the operations described above, the silica-based particles B-(s3) having pores, cavities or voids at least inside thereof were obtained.

Example 3

Preparation of Coated Porous Silica-Based Particles C 4 grams of the silica-based particles B-(e2) was added in 80 grams of pure water, and then 12 grams of ethanol was dispersed in the mixture solution, and furthermore an aqueous solution of sodium hydroxide with the concentration of 1% by weight (produced by Kanto Chemical Co., Ltd) was added to the mixture solution to adjust pH to 11, and the mixture solution was heated to 90° C. with agitation at the rotating speed of 100 rpm. Furthermore, preserving the temperature, 15.3 grams of an silicic acid solution with the concentration of 3.5% by weight (as calculated in terms of $SiO_2$) obtained by de-alkalizing an aqueous solution of sodium silicate (produced by Doukai Chemical Industries Co., Ltd.) using a cation-exchange resin (produced by Mitsubishi Chemical Corporation) was added to the mixture solution, and the resultant mixture solution was agitated for 2 hours at the rotating speed of 100 rpm.

Then, silica-based particles were separated from the aqueous solution with a centrifugal separator (produced by Kokusan Chemical Co., Ltd.: H-900), and pure water was added in the obtained cake-like mass with agitation at the rotating speed of 200 rpm to prepare a dispersion of the silica-based particles, and furthermore the silica-based particles were separated with a centrifugal separator. This operation was repeated 3 times. The silica-based particles (cake-like mass) sufficiently washed as described above was dried for 2 hours at the temperature of 110° C.

With the operations described above, silica-based particles C-(e) having pores, cavities or voids inside thereof and also with at least the surface coated with silicon components was obtained, Heating Process 3 grams of the silica-based particles C-(e) was heated for 2 hours at the temperature of 500° C.

With this operation, the silica-based particles C-(s) having pores, cavities or voids inside thereof was obtained.

Example 4

Preparation of Porous Silica-Based Particles D to Q

The silica-based particles D-(e2) to Q-(e2) were prepared under the same conditions as those employed for preparation of the silica-based particles B-(e2) as described in Example 2, except that the silica-based particle precursors D-(a) to Q-(a) were prepared under the conditions as shown in Table 1, the conditions of which are different from those employed in step (a) of Example 2. To make a comparison among them easily, the conditions for preparing the silica-based particles B-(e2) are also shown in Table 1.

TABLE 1

| Example particle No. | Preparation of mixed aqueous solution | | | | Temperature of mixed aqueous solution (° C.) | pH of mixed aqueous solution | Left at (° C.) | Left for (Hr) |
|---|---|---|---|---|---|---|---|---|
| | Pure water (g) | n-butyl alcohol (g) | NH$_4$OH (28 wt %) (g) | Surfactant (g) | | | | |
| B-(e2) | 69.80 | 1.75 | 0.70 | 3.75 | 0~1 | 9.2 | 15 | 2 |
| D-(e2) | 13.96 | 0.35 | 0.14 | 3.75 | 0~1 | 8.1 | 15 | 35 |
| E-(e2) | 41.90 | 1.05 | 0.40 | 3.75 | 0~1 | 8.8 | 15 | 3 |
| F-(e2) | 69.80 | 1.75 | 0.70 | 3.75 | 0~1 | 9.2. | 15 | 3 |
| G-(e2) | 139.60 | 3.50 | 1.40 | 3.75 | 0~1 | 9.6 | 15 | 3 |
| H-(e2) | 279.20 | 7.00 | 2.80 | 3.75 | 0~1 | 9.9 | 15 | 3 |
| I-(e2) | 418.80 | 10.50 | 4.20 | 3.75 | 0~1 | 10.2 | 15 | 3 |
| J-(e2) | 41.90 | 1.05 | 0.40 | 3.75 | 5 | 8.7 | 15 | 3 |
| K-(e2) | 41.90 | 1.05 | 0.40 | 3.75 | 15 | 8.7 | 15 | 3 |
| L-(e2) | 41.90 | 1.05 | 0.40 | 3.75 | 0~1 | 8.7 | 10 | 1 |
| M-(e2) | 41.90 | 1.05 | 0.40 | 3.75 | 0~1 | 8.7 | 15 | 1 |
| N-(e2) | 41.90 | 1.05 | 0.40 | 3.75 | 0~1 | 8.7 | 15 | 2 |
| O-(e2) | 41.90 | 1.05 | 0.40 | 3.75 | 0~1 | 8.7 | 15 | 5.5 |
| P-(e2) | 41.90 | 1.05 | 0.40 | 3.75 | 0~1 | 8.7 | 45 | 3 |
| Q-(e2) | 69.80 | 1.75 | 0.70 | 3.75 | 0~1 | 9.2 | 15 | 1 |

Example 5

Preparation of Porous Silica-Based Particles R to X

The following silica-based particles R-(e2) to X-(e2) were prepared under the same conditions as those employed for preparing the silica-based particles B-(e2) as described in Example 2, except that the silica-based particles R-(b) to X-(b) were prepared under the conditions as shown in Table 2, the conditions of which are different from those employed in step (b) of Example 2. To make a comparison among them easily, the conditions for preparing the silica-based particles B-(e2) are also shown in Table 2.

TABLE 2

| Example Particle No. | Quantity of sodium aluminate added in the mixed aqueous solution (g) | Wight ratio of sodium aluminate/organic silicon compound (in terms of Al$_2$O$_3$/SiO$_2$) | Left at (° C.) | Left for (Hr) |
|---|---|---|---|---|
| B-(e2) | 42.7 | 5/95 | 18 | 15 |
| R-(e2) | 21.4 | 2.5/97.5 | 18 | 15 |
| S-(e2) | 85.4 | 10/90 | 18 | 15 |
| T-(e2) | 170.8 | 20/80 | 18 | 15 |
| U-(e2) | 42.7 | 5/95 | 18 | 3 |
| V-(e2) | 42.7 | 5/95 | 18 | 8 |
| W-(e2) | 42.7 | 5/95 | 18 | 50 |
| X-(e2) | 42.7 | 5/95 | 50 | 15 |

Example 6

Porous Silica-Based Particles

Measurement was performed for an average diameter (with Multisizer II produced by Beckman Coulter Inc.), a compacting bulk density, an oil absorption rate, and a compressive strength (with MCTM-200 produced by Shimazu Co., Ltd.) for the porous silica-based particles A-(c), B-(c), B-(e1), B-(e2), B-(s1), B-(s2), B-(s3), C-(e), C-(s), and D-(e2) to X-(e2). Results of the measurement are shown in Table 3.

As clearly shown in Table 3, the porous silica-based particles A-(c), B-(c), B-(e1), B-(e2), B-(s1), B-(s2), B-(s3), C-(e), C-(s), E-(e2), F-(e2), G-(e2), J-(e2), L-(e2), M-(e2), N-(e2), O-(e2), Q-(e2), S-(e2), T-(e2), U-(e2), V-(e2) and W-(e2) have the average diameter being in the range from 1 to 15 μm, and the compacting bulk density being in the range from 0.25 to 0.62 g/cm$^3$. Namely, it is understood that porosity of these silica-based particles is relatively high. (Porosity of these silica-based particles is expressed as "high" in Table 3.)

The oil absorption rate of the above porous silica-based particles is in the range from 0.63 to 1.53 ml/g, and the compressive strength is in the range from 4 to 100 kgf/mm$^2$.

To describe more specifically, in the case of the porous silica-based particles A-(c) and B-(c) having a covering layer on the surface thereof, and in the case of the porous silica-based particles B-(e1) with a portion of the covering layer still remaining on the surface thereof, the oil absorption rate is in the range from 0.63 to 1.32 ml/g. In the case of the porous silica-based particles B-(e2), B-(s1), B-(s2), B-(s3), E-(e2), F-(e2), G-(e2), J-(e2), L-(e2), M-(e2), N-(e2), O-(e2), Q-(e2), S-(e2), T-(e2), U-(e2), V-(e2) and W-(e2), not having a covering layer on the surface thereof, the oil absorption rate is in the range from 0.70 to 1.53 ml/g. Furthermore, also in the case of the silica-based particles C-(e) and C-(s) prepared by coating the surfaces of the porous silica-based particles B-(e2) not having a covering layer on the surface thereof, the oil absorption rate is in the range from 0.63 to 1.32 ml/g.

The compressive strength is in the range from about 4 to 15 kgf/mm$^2$ in the case of the porous silica-based particles A-(c), B-(c), B-(e1), B-(e2), C-(e), E-(e2), F-(e2), G-(e2), J-(e2), L-(e2), M-(e2), N-(e2), O-(e2), Q-(e2), S-(e2), T-(e2), U-(e2), V-(e2) and W-(e2) having been subjected only to the drying process, and is in the range from about 15 to 30 kfg/mm$^2$ in the case of the silica-based particles B-(s1), B-(s2) and C-(s) having been heated at a relatively low temperature, and also is in the range from about 30 to 100 kfg/mm$^2$ in the case of the silica-based particles B-(s3) having been heated at a relatively high temperature.

In the case of the porous silica-based particles D-(e2), H-(e2), I-(e2), K-(e2), P-(e2), R-(e2) and X-(e2), the average diameter is in the range from 1 to 15 μm, but the compacting bulk density is in the range from 0.63 to 0.76 g/cm$^3$. Namely, porosity of these silica-based particles is not so high. (Porosity of these silica-based particles is expressed as "low" in Table 3.)

Furthermore, an oil absorption rate of the porous silica-based particles is in the range from 0.51 to 0.62 ml/g, and the compressive strength is in the range from 30 to 37 kgf/mm$^2$.

This is due to that the density inside the particle is high and a degree of increasing the porosity is low, as compared to the porous silica-based particles as described above. However, the degree of increasing the porosity is relatively high, as compared to those in the case of the silica-based particles Y-(c) and Y-(s1) as shown in Table 4.

In the porous silica-based particles T-(e2), it is observed that a portion thereof has been dissolved slightly and the dissolved one is deposited on surfaces of the particles.

As a result, it is understood that, also in the method of producing the porous silica-based particles according to the present invention, the suitable operations should satisfy the following conditions:

1) In step (a) of preparing silica-based particle precursors, the organic solvent, the alkali, and the surfactant should be added so that pH of the mixed aqueous solution containing the organic silicon compound and water (two-layer separated liquid) is in the range from 8.2 to 9.8.

2) In the step (a) as described above, the mixed aqueous solution containing the organic silicon compound and water (two-layer separated liquid) should be agitated slowly, before and after addition of the organic solvent, the alkali, and the surfactant, preserving the temperature of the mixed aqueous solution in the range from 0.1 to 10° C. until the organic silicon compound layer substantially disappears.

3) In the step (a) as described above, after the organic silicon compound layer has substantially disappeared, the mixed aqueous solution is left for 0.1 to 7 hours with agitation at the temperature of 1 to 30° C.

4) In the step (b) of preparing the silica-based particles having pores, cavities or voids inside thereof, addition of the sodium aluminate is performed so that the weight ratio of $Al_2O_3/SiO_2$ is in the range from 3/97 to 20/80, wherein $Al_2O_3$ represents the sodium aluminate and $SiO_2$ represents the organic silicon compound.

5) In the step (b) as described above, after the sodium aluminate has been added, the mixed aqueous solution is left for 0.5 to 50 hours with agitation at the temperature of 5 to 30° C.

Furthermore, analysis of data shown in Table 3 indicates the following results.

In the step (a) as described above, when the pH is adjusted to a lower value with addition of the organic solvent, the alkali, and the surfactant, an average diameter of the porous silica-based particles becomes relatively large, and when the pH is adjusted to a higher value, the average diameter of the porous silica-based particles becomes relatively smaller.

In the step (b) as described above, when the sodium aluminate is added in the mixed aqueous solution with a larger weight ratio of $Al_2O_3/SiO_2$ than that of the figure as defined above, the silica-based particle precursors show the tendency to easily dissolve and collapse, and when the sodium aluminate is added with a lower weight ratio of $Al_2O_3/SiO_2$ than that of the figure as defined above, the sodium aluminate is hardly permeated into the silica-based particle precursors, and the density inside the particles becomes higher, which results in a higher compressive strength and a lower porosity of the particles.

In the step (b) as described above, when the time for leaving the mixed solution after addition of the sodium aluminate has been finished becomes shorter, the particle density generally becomes higher, and also the compressive strength becomes higher. When the time becomes longer, the particle density becomes lower, and also the compressive strength becomes lower.

Figure 2:
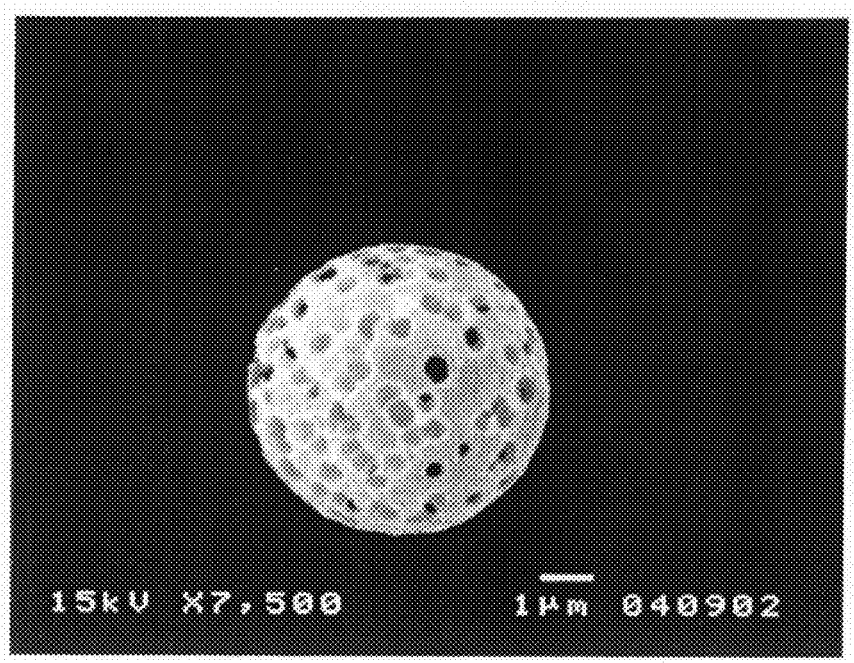
FIG. 2 is a picture taken by a scanning electron microscope (7,500 magnifications) of porous silica-based particles B-(e1) (with a partial covering layer) according to the present invention obtained in the step (e) of Example 2.
Figure 3:
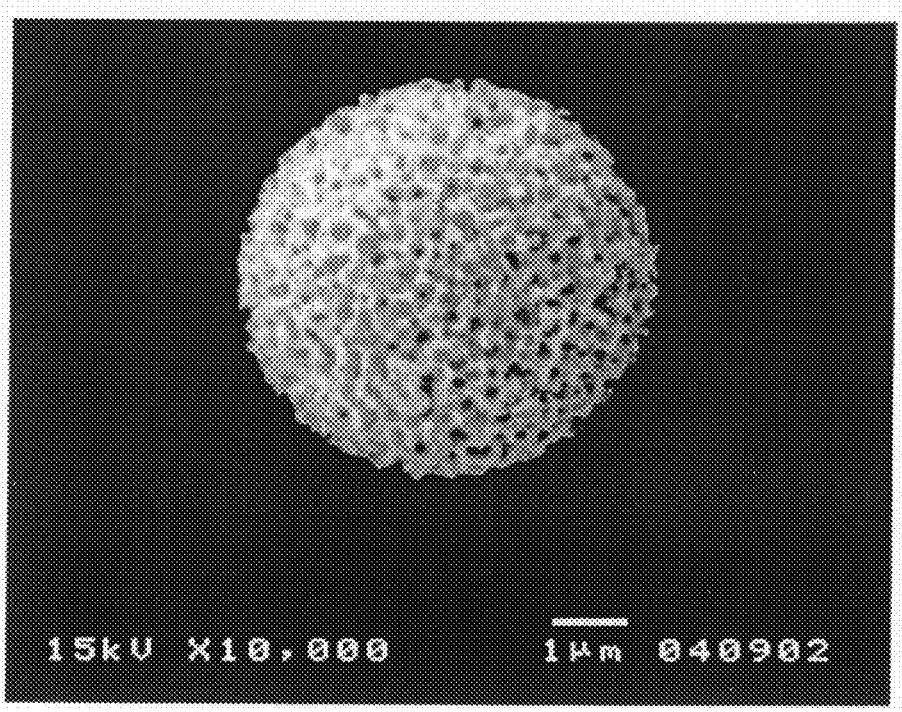
FIG. 3 is a picture taken by a scanning electron microscope (10,000 magnifications) of porous silica-based particles B-(e2) (without a covering layer) according to the present invention obtained in the step (e) of Example 2.

FIG. 1, FIG. 2 and FIG. 3 show pictures (SEM) of the porous silica-based particles B-(c), B-(e1), and B-(e2) taken by a scanning electron microscope (JSM-5410 LV produced by Japan Electronic Datum Co., Ltd).

As shown in FIG. 1, it is observed that the surface of the porous silica-based particle B-(c) is covered with a covering layer, and only some hollows (with a relatively large pore size) are exposed on the surface.

It is further observed from a picture (not shown) taken at the place where a portion of the covering layer was broken that a number of pores, cavities or voids exists inside the particles. Furthermore, it is confirmed by using a microscope with a higher resolution that the covering layer has a number of pores with a relatively small pore size, the pore size is considerably smaller than that of the pores, cavities or voids as described above.

Also, as shown in FIG. 2, it is observed that the porous silica-based particle B-(e1) prepared by dissolving a portion of the covering layer formed on the surface of the porous silica-based particle B-(c) has dimples and/or hollows partially exposed on the surface where the pores, cavities or voids exist inside but near a surface of the particle, and the pores, cavities or voids are not always exposed on the particle surface.

On the other hand, as shown in FIG. 3, it is observed that the porous silica-based particle B-(e2) prepared by dissolving all of the covering layer as described above has a number of pores, cavities or voids exposed on the particle surface, and the particle looks like a pumice stone with a rough surface.

TABLE 3

| Example particle No. | Average diameter (μm) | Compacting bulk density (g/cm$^3$) | Oil absorption rate (ml/g) | Compressive strength (kgf/mm$^2$) | Porosity |
|---|---|---|---|---|---|
| A-(c) | 4.7 | 0.47 | 0.66 | 5 | High |
| B-(c) | 6.0 | 0.40 | 0.89 | 5 | High |
| B-(e1) | 5.8 | 0.42 | 0.88 | 4 | High |
| B-(e2) | 4.3 | 0.30 | 1.48 | 6 | High |
| B-(s1) | 5.2 | 0.60 | 0.74 | 21 | High |
| B-(s2) | 3.6 | 0.48 | 1.03 | 18 | High |
| B-(s3) | 3.1 | 0.62 | 0.87 | 73 | High |
| C-(e) | 4.4 | 0.32 | 1.32 | 7 | High |
| C-(s) | 3.7 | 0.51 | 1.15 | 24 | High |
| D-(e2) | 5.2 | 0.73 | 0.55 | 34 | Low |
| E-(e2) | 5.0 | 0.42 | 0.83 | 6 | High |
| F-(e2) | 4.8 | 0.41 | 0.85 | 9 | High |
| G-(e2) | 4.1 | 0.60 | 0.70 | 15 | High |
| H-(e2) | 3.2 | 0.65 | 0.62 | 33 | Low |
| I-(e2) | 2.0 | 0.70 | 0.56 | 30 | Low |
| J-(e2) | 4.4 | 0.44 | 0.81 | 10 | High |
| K-(e2) | 5.5 | 0.63 | 0.60 | 31 | Low |
| L-(e2) | 4.0 | 0.35 | 1.23 | 5 | High |
| M-(e2) | 4.2 | 0.46 | 0.81 | 8 | High |
| N-(e2) | 6.3 | 0.45 | 1.03 | 5 | High |
| O-(e2) | 5.9 | 0.42 | 0.87 | 4 | High |
| P-(e2) | 5.2 | 0.74 | 0.52 | 37 | Low |
| Q-(e2) | 3.9 | 0.27 | 1.53 | 4 | High |
| R-(e2) | 6.2 | 0.76 | 0.53 | 37 | Low |
| S-(e2) | 6.9 | 0.25 | 1.50 | 15 | High |
| T-(e2) | 6.5 | 0.58 | 0.70 | 13 | High |
| U-(e2) | 4.5 | 0.56 | 0.81 | 11 | High |
| V-(e2) | 4.9 | 0.57 | 0.85 | 5 | High |
| W-(e2) | 3.8 | 0.39 | 1.25 | 5 | High |
| X-(e2) | 8.1 | 0.73 | 0.51 | 30 | High |

Comparative Example 1

Preparation of Silica-Based Particles Y

Under the conditions employed in step (a) of Example 2, 3741.4 grams of the mixed aqueous solution containing the silica-based particle precursors Y-(a) was prepared.

Then, the mixed aqueous solution was transferred to a stainless steel container (with a cover), and was left for 12 hours in the static state for stabilization at the temperature of 80° C. With this operation, a mixed aqueous solution containing the stabilized silica-based particles Y-(b) was obtained.

The supernatant liquid of the mixed aqueous solution containing the silica-based particles Y-(b) obtained as described above was discharged, and then the lower part of the liquid remained in the container was added in 3000 grams of a mixture solution prepared by mixing pure water and ethanol by 2:1, and furthermore the silica-based particles Y-(b) was dispersed in the mixture solution by using a supersonic disperser with a phone (produced by Kaijou Co., Ltd.). Then, the mixture solution with a dispersion was processed with a centrifugal separator (H-900 produced by Kosan Chemical Co., Ltd) to separate the silica-based particles Y-(b).

The obtained cake-like mass was dried for 12 hours at the temperature of 110° C. With the operation, about 160 grams of dried silica-based particles Y-(c) was obtained.

Then, 50 grams of the silica-based particles Y-(c) was heated for 2 hours at the temperature of 500° C. in the atmospheric air. The operation above provided the silica-based particles Y-(S1) having been subjected to heating processing.

Comparative Example 2

Silica-Based Particles

Measurement was made for an average diameter, a compacting bulk density, an oil absorption rate, and a compressive strength of the silica-based particles Y-(c) and Y-(S1) prepared in Comparative Example 1, by using the same methods as described in Example 6. A result is shown in Table 4.

As clearly shown in Table 4, the silica-based particles prepared without adding sodium aluminate have not only high compacting bulk density, but also an extremely smaller oil absorption rate, and a substantially high compressive strength as compared to those of the porous silica-based particles according to the present invention.

Furthermore, surfaces and inside (crushed ones) of the particles were observed with a scanning electron microscope, and it was found that the particles have high density inside thereof and did not have pores, cavities or voids.

TABLE 4

| Example particle No. | Average diameter (μm) | Compacting bulk density (g/cm³) | Oil absorption rate (ml/g) | Compressive Strength (kgf/mm²) |
|---|---|---|---|---|
| Y-(c) | 7.0 | 0.80 | 0.39 | 45 |
| Y-(S1) | 5.8 | 1.08 | 0.23 | 150 |

Example 7

Preparation of Silica-Based Particles Z with Organic Compound Absorbed Therein 5 grams of the porous silica-based particles prepared in Example 2 was put into a plastic container with a capacity of 100 ml.

Then, an amine-based resin curing agent (Polymate RD-1 produced by Japan Epoxy Resin Co., Ltd.) was dripped by 4 or 5 droplets with a viewlet onto a central portion of the agglomerate of the particles, and the plastic container was vibrated each time the curing agent was dripped to homogeneously mix the materials. The operation was repeated, and 4.5 ml of the resin curing agent was dripped in total amount.

With the operations, 8 grams of the silica-based particles Z-(f) adsorbed sufficiently the resin curing agent into inside thereof were obtained.

Preparation of Coated Silica-Based Particles Z 8 grams of the silica-based particles Z-(f) having adsorbed the resin curing agent as described above and 0.8 grams of methyl methacrylate resin (MP-4951 produced by Soken Chemical Co., Ltd.) were put in a mortar heated previously at the temperature of 50° C. to 60° C., and slightly grinded to obtain silica-based particles Z-(p) coated with the methyl methacrylate resin adhered to the surfaces. In this step, the methyl methacrylate resin having not adhered to the surfaces of the particles was removed.

Utilization of Coated Silica-Based Particles 8 grams of the coated silica-based particles Z-(p) obtained as described above (i.e. a kind of microcapsules containing the amine-based resin curing agent inside the particles and coated by the methyl methacrylate resin) was mixed and dispersed in 15 grams of epoxy resin (Epicoat 828 produced by Japan Epoxy resin Co., Ltd.) as a matrix component, and the mixture components was applied on a glass substrate. Then the substrate was heated at the temperature of 80° C.

With this operation, the methyl metacrylate coated on the particles was melted by the heating, and then the resin curing agent was exuded to outside of the particles. As a result, the resin curing agent reacted with the epoxy resin, and the epoxy resin was cured.

Because of the feature as described above, the coated silica-based particles according to the present invention can advantageously be used as a microcapsule with an encapsulated component absorbed in the particles which enables to react with the matrix component or the like.

What is claimed is:

1. A method of producing porous silica-based particles, comprising the steps of:
   (a) preparing two-phase liquid consisting of an organic phase containing an organic silicon compound expressed by the following general formula (I) and a water phase, then adding an organic solvent, an alkali, and a surfactant into the water phase to form a mixed aqueous solution while agitating at least the water phase so that the organic phase and the water phase are not completely mixed with each other, and further agitating to hydrolyze and/or partially hydrolyze the organic silicon compound in mixed aqueous solution to obtain silica-based particle precursors;

$$R^1_n Si(OR^2)_{4-n} \qquad (I)$$

(wherein $R^1$ is a monovalent group selected from an alkyl group having a number of carbon atoms from 1 to 10, an aryl group having a number of carbon atoms from 6 to 10, and an unsaturated aliphatic group having a number of carbon atoms from 2 to 10, which are allowed to contain substituent groups therein, and $R^2$ is a monovalent group selected from a hydrogen atom, an alkyl group having a number of carbon atoms from 1 to 5, and an acyl group having a number of carbon atoms from 2 to 5, and then n is an integer from 1 to 3.)

(b) adding sodium aluminate into the mixed aqueous solution containing the silica-based particle precursors thereby producing porous silica-based particles having pores, cavities or voids inside the particles; and
   (c) washing and drying the porous silica-based particles.

2. The method of producing porous silica-based particles according to claim 1, wherein, in the step (a), a temperature of the two-phase liquid is maintained in a range from 0.1 to 10°

C. and the organic solvent, the alkali and the surfactant are added so that pH of the mixed aqueous solution is in a range from 8.2 to 9.8, and then the mixed aqueous solution is agitated at a speed from 30 to 100 rpm until the organic silicon compound phase substantially disappears.

3. The method of producing porous silica-based particles according to claim 1, wherein, in the step (a), the mixed aqueous solution is left for 0.1 to 7 hours at a temperature in a range from 1 to 30° C. while agitating the mixed aqueous solution, after the organic phase has substantially disappears.

4. The method of producing porous silica-based particles according to claim 1, wherein, in the step (a), the organic solvent is compatible with water and also is composed of one or more selected from the group consisting of alcohols, glycols, glycol ethers, and ketones capable of diluting or dispersing the organic silicon compound.

5. The method of producing porous silica-based particles according to claim 1, wherein, in the step (a), the alkali is composed of one or more selected from the group consisting of an aqueous ammonia solution, ammonia gas, an aqueous solution of alkali metal salt, an aqueous solution of quaternary ammonium salt and amines, and all of which act as hydrolytic catalyst for the organic silicon compounds.

6. The method of producing porous silica-based particles according to claim 1, wherein, in the step (a), the surfactant is composed of one or more selected from the group consisting of anion-based surfactants.

7. The method of producing porous silica-based particles according to claim 1, wherein, in the step (b), when calculating the sodium aluminate as $Al_2O_3$ and the organic silicon compound as $SiO_2$, the sodium aluminate is added within a weight ratio of $Al_2O_3/SiO_2$ from 3/97 to 20/80.

8. The method of producing porous silica-based particles according to claim 1, wherein, in the step (b), the mixed aqueous solution is left for 0.5 to 50 hours at a temperature in a range from 5 to 30° C. while agitating the mixed aqueous solution after the sodium aluminate has been added.

9. The method of producing porous silica-based particles according to claim 1, wherein, the silica-based particles dried in the step (c) are further heated at a temperature in a range from 200 to 1100° C.

10. A method of producing porous silica-based particles with surfaces coated by a silicon compound or a hydrolysate thereof, wherein a solution prepared by dissolving or suspending a silicon compound in an organic solvent, water, or a mixture thereof, is added in a suspension prepared by suspending or dispersing the porous silica-based particles produced by the method according to claim 1 in an organic solvent, water, or a mixture thereof, to produce the porous silica-based particles with the surfaces coated by the silicon compound or the hydrolysate thereof.

11. The method of producing porous silica-based particles according to claim 1, wherein an oil absorption rate of the porous silica-based particles is in a range from 0.63 to 1.53 ml/g.

12. The method of producing porous silica-based particles according to claim 11, wherein the organic silicon compound is composed of one or more selected from the group consisting of ethyl silicate, methyl silicate, and organic s ilicon compounds expressed by the general formula (I) above.

13. The method of producing porous silica-based particles according to claim 11, wherein the porous silica-based particles coated with the silicon components are washed and dried, and if necessary, then heated at a temperature in a range from 200 to 1100 ° C.

14. The method of producing porous silica-based particles according to claim 10, wherein the coating layer on the silica-based particle has a thickness in a range from 0.005 to 2μm.

15. A method of producing porous silica-based particles with surfaces coated by an organic compound, wherein a powdery organic compound is adhered to surfaces of the porous silica-based particles obtained from the method according to claim 1 and further, melting at least a portion of the adhered organic compound to produce the porous silica-based particles with the surfaces coated by the organic compound.

16. The method of producing porous silica-based particles according to claim 15, wherein the organic compound is a thermoplastic resin having a glass transition point of 200 ° C. or less, or a thermoplastic resin having a hardening temperature of 200 ° C. or less 17. The method of producing porous silica-based particles according to claim 16, wherein the thermoplastic resin is selected from the group consisting of a methyl methacrylate resin, an acrylic styrene copolymer resin,and a mixture thereof.

18. A method of producing porous silica-based particles with surfaces of organic compounds, wherein a powdery organic compound is adhered to surfaces of the porous silica-based particles obtained from the method according to claim 1 and further, at least a portion of the adhered organic compounds is melted, to obtain the porous silica-based particles with the surfaces coated with the organic compounds.

19. The method of producing porous silica-based particles according to claim 1, wherein of the porous silica-based particles have an average particle diameter in a range from 1 to 15 μm and also have a compacting bulk density thereof is in a range from 0.25 to 0.62 g/cm$^3$.

20. The method of producing porous silica-based particles according to claim 1, wherein the porous silica-based particles have an oil absorption rate in a range from 0.63 to 1.53 ml/g.

21. A method of producing porous silica-based particles, comprising the steps of:
(a) preparing two-phase liquid consisting of an organic phase containing an organic silicon compound expressed by the following general formula (I) and a water phase, then adding an organic solvent, an alkali, and a surfactant into the water phase to form a mixed aqueous solution, while agitating at least the water phase so that the organic phase and the water phase are not completely mixed with each other, and further agitating to hydrolyze and/or partially hydrolyze the organic silicon compound in the mixed aqueous solution to prepare silica-based particle precursors;

$$R^1{}_nSi(OR^2)_{4-n} \qquad (I)$$

(wherein $R^1$ is a monovalent group selected from an alkyl group having a number of carbon atoms from 1 to 10, an aryl group having a number of carbon atoms from 6 to 10, and an unsaturated aliphatic group having a number of carbon atoms from 2 to 10, which are allowed to contain substituent groups therein, and $R^2$ is a monovalent group selected from a hydrogen atom, an alkyl group having a number of carbon atoms from 1 to 5, and an acyl group having a number of carbon atoms from 2 to 5, and then n is an integer from 1 to 3.)

(b) adding sodium aluminate into the mixed aqueous solution containing the silica-based particle precursors, thereby producing porous silica-based particles having pores, cavities or voids inside the particles; and (c) washing and drying the porous silica-based particles, if necessary;
(d) adding the porous silica-based particles in an alkaline aqueous solution to dissolve a part of a covering layer formed on an external peripheral surface of the porous silica-based particles; and
(e) washing and drying the porous silica-based particles with a part of the covering layer having been dissolved.

22. The method of producing porous silica-based particles according to claim 21, wherein, the sted (d), the alkaline aqueous solution contains an alkali metal hydroxide.

23. The method of producing porous silica-based particles according to claim 21, wherein the silica-based particles dried in the step (e) are further heated to a temperature in a range from 200 to 1100° C.

24. Method producing porous silica-based particles according to claim 21, wherein the porous silica-based particles have an average diameter in a range from 1 to 15 μm and a compressive bulk strength in a range from 0.25 to 0.62 g/cm$^3$.

* * * * *